US012525183B2

(12) United States Patent
Yuan et al.

(10) Patent No.: US 12,525,183 B2
(45) Date of Patent: Jan. 13, 2026

(54) DISPLAY PANEL AND DISPLAY APPARATUS

(71) Applicants: Hefei BOE Joint Technology Co., Ltd., Anhui (CN); BOE TECHNOLOGY GROUP CO., LTD., Beijing (CN)

(72) Inventors: Zhidong Yuan, Beijing (CN); Yongqian Li, Beijing (CN); Can Yuan, Beijing (CN); Liu Wu, Beijing (CN)

(73) Assignees: HEFEI BOE JOINT TECHNOLOGY CO., LTD., Anhui (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/262,322

(22) PCT Filed: Jun. 1, 2022

(86) PCT No.: PCT/CN2022/096678

§ 371 (c)(1),
(2) Date: Jan. 10, 2025

(87) PCT Pub. No.: WO2023/230963

PCT Pub. Date: Dec. 7, 2023

(65) Prior Publication Data

US 2025/0140182 A1 May 1, 2025

(51) Int. Cl.

| | |
|---|---|
| ***G09G 3/3233*** | (2016.01) |
| ***G09G 3/32*** | (2016.01) |
| ***G09G 3/3258*** | (2016.01) |

(52) U.S. Cl.

CPC ............. *G09G 3/3233* (2013.01); *G09G 3/32* (2013.01); *G09G 3/3258* (2013.01); *G09G 2300/0426* (2013.01); *G09G 2310/08* (2013.01)

(58) Field of Classification Search

CPC ...... G09G 3/3233; G09G 3/32; G09G 3/3258; G09G 2310/08; G09G 2300/0426

(Continued)

(56) References Cited

U.S. PATENT DOCUMENTS

| | | | | |
|---|---|---|---|---|
| 9,129,923 B1 * | 9/2015 | Han | ..................... | G09G 3/3233 |
| 11,877,482 B2 * | 1/2024 | Yuan | .................... | H10K 59/131 |

(Continued)

FOREIGN PATENT DOCUMENTS

| | | |
|---|---|---|
| CN | 105097867 A | 11/2015 |
| CN | 111028774 A | 4/2020 |

(Continued)

*Primary Examiner* — Tom V Sheng
(74) *Attorney, Agent, or Firm* — XSENSUS LLP

(57) ABSTRACT

A display panel includes a first pixel driving circuit and a second pixel driving circuit. A data writing transistor and a driving transistor in the first pixel driving circuit, a driving transistor and a data writing transistor in the second pixel driving circuit are sequentially arranged. In the first pixel driving circuit, a first electrode plate of a capacitor is coupled to the driving transistor at a first coupling position and coupled to a first light-emitting device at a second coupling position located at a side of the first coupling position away from the data writing transistor. In the second pixel driving circuit, a first electrode plate of a capacitor is coupled to the driving transistor at a third coupling position and coupled to a second light-emitting device at a fourth coupling position located between the third coupling position and the data writing transistor.

20 Claims, 23 Drawing Sheets

(58) Field of Classification Search
USPC .......................................................... 345/204
See application file for complete search history.

(56) References Cited

U.S. PATENT DOCUMENTS

| | | | | |
|---|---|---|---|---|
| 2006/0114193 | A1 | 6/2006 | Kwak et al. | |
| 2009/0295423 | A1* | 12/2009 | Levey .................. | G09G 3/3233 324/760.01 |
| 2015/0029238 | A1* | 1/2015 | Kanda .................. | G09G 3/3291 345/212 |
| 2021/0358420 | A1 | 11/2021 | Yang et al. | |
| 2021/0398492 | A1 | 12/2021 | Zhang et al. | |
| 2022/0036813 | A1 | 2/2022 | Hwang et al. | |
| 2022/0139329 | A1* | 5/2022 | Bai ...................... | G09G 3/3258 345/204 |
| 2022/0180816 | A1 | 6/2022 | Yuan et al. | |
| 2024/0005869 | A1* | 1/2024 | Zhang .................. | G09G 3/3266 |
| 2024/0420640 | A1* | 12/2024 | Hwang .................... | G09G 3/32 |

FOREIGN PATENT DOCUMENTS

| | | | |
|---|---|---|---|
| CN | 114067754 | A | 2/2022 |
| CN | 114080688 | A | 2/2022 |
| CN | 111816123 | B | 6/2022 |

* cited by examiner

DISPLAY PANEL AND DISPLAY APPARATUS

CROSS-REFERENCE TO RELATED APPLICATION

This application is a national phase entry under 35 USC 371 of International Patent Application No. PCT/CN2022/096678, filed on Jun. 1, 2022, which is incorporated herein by reference in its entirety.

TECHNICAL FIELD

The present disclosure relates to the field of display technologies, and in particular, to a display panel and a display apparatus.

BACKGROUND

Display panels, such as organic light-emitting diode (OLED) display panels, have a broad development prospect due to their advantages of self-luminescence, lightness and thinness, low power consumption, good color reproduction, fast response speed, and wide viewing angle.

SUMMARY

In a first aspect, a display panel is provided. The display panel includes a data line, a first light-emitting device, a second light-emitting device, a first pixel driving circuit and a second pixel driving circuit. Each of the first pixel driving circuit and the second pixel driving circuit includes: a capacitor, a driving transistor and a data writing transistor. The data writing transistor is coupled to the data line and the driving transistor, and the capacitor includes a first electrode plate and a second electrode plate.

The data writing transistor in the first pixel driving circuit, the driving transistor in the first pixel driving circuit, the driving transistor in the second pixel driving circuit and the data writing transistor in the second pixel driving circuit are sequentially arranged along an extending direction of the data line. The first electrode plate in the first pixel driving circuit is coupled to the driving transistor in the first pixel driving circuit at a first coupling position, and is coupled to the first light-emitting device at a second coupling position; the second coupling position is located at a side of the first coupling position away from the data writing transistor in the first pixel driving circuit. The first electrode plate in the second pixel driving circuit is coupled to the driving transistor in the second pixel driving circuit at a third coupling position, and is coupled to the second light-emitting device at a fourth coupling position; the fourth coupling position is located between the third coupling position and the data writing transistor in the second pixel driving circuit.

Optionally, the driving transistor includes an active layer, and the active layer of the driving transistor includes a plurality of semiconductor segments that are sequentially distributed along the extending direction of the data line and coupled to each other, and an extending direction of a semiconductor segment in the plurality of semiconductor segments intersects the extending direction of the data line. The second coupling position is located at a side of a plurality of semiconductor segments in the first pixel driving circuit away from the first coupling position. The fourth coupling position is located at a side of a plurality of semiconductor segments in the second pixel driving circuit proximate to the third coupling position.

Optionally, the display panel further includes a first transfer pattern, a first insulating layer and a second insulating layer. The first insulating layer is located between the first transfer pattern and the first electrode plate in the first pixel driving circuit, the first insulating layer having a first through hole located at the second coupling position. The second insulating layer is located between the first transfer pattern and the first light-emitting device, the second insulating layer having a second through hole located at the second coupling position. The first transfer pattern is coupled to the first electrode plate in the first pixel driving circuit at the first through hole, and is coupled to the first light-emitting device at the second through hole. The first through hole and the second through hole are staggered in a thickness direction of the display panel.

Optionally, the display panel further includes a second transfer pattern. The first insulating layer is also located between the second transfer pattern and the first electrode plate in the second pixel driving circuit, and the first insulating layer further has a third through hole located at the fourth coupling position. The second insulating layer is also located between the second transfer pattern and the second light-emitting device, and the second insulating layer further has a fourth through hole located at the fourth coupling position. The second transfer pattern is coupled to the first electrode plate in the second pixel driving circuit at the third through hole, and is coupled to the second light-emitting device at the fourth through hole. The third through hole and the fourth through hole are staggered in the thickness direction of the display panel.

Optionally, a line connecting centers of the first through hole and the second through hole intersects a line connecting centers of the third through hole and the fourth through hole.

Optionally, the first transfer pattern and the second transfer pattern each are substantially in a shape of a rectangle. The first through hole and the second through hole are sequentially arranged along a long side of the first transfer pattern, and the third through hole and the fourth through hole are sequentially arranged along a long side of the second transfer pattern.

Optionally, the long side of the first transfer pattern is substantially parallel to the extending direction of the data line, and the long side of the second transfer pattern intersects the extending direction of the data line.

Optionally, in the extending direction of the data line, a distance between the second through hole and the fourth through hole is substantially equal to a pixel dimension of the display panel.

Optionally, the first electrode plate in the first pixel driving circuit and the first electrode plate in the second pixel driving circuit have different shapes, and an overlapping area between the first electrode plate and the second electrode plate in the first pixel driving circuit is equal to an overlapping area between the first electrode plate and the second electrode plate in the second pixel driving circuit.

Optionally, the second electrode plate in the first pixel driving circuit and the second electrode plate in the second pixel driving circuit have different shapes.

Optionally, a gate of the data writing transistor in each of the first pixel driving circuit and the second pixel driving circuit includes two first sub-gates coupled to each other, the data writing transistor has a first groove, and the first groove separates the two first sub-gates. An opening of a first groove in the first pixel driving circuit and an opening of a first groove in the second pixel driving circuit face each other.

Optionally, the driving transistor in each of the first pixel driving circuit and the second pixel driving circuit includes:

a gate, a first electrode and a second electrode; the second electrode of the driving transistor is coupled to the first electrode plate in a same pixel driving circuit. The first pixel driving circuit and the second pixel driving circuit each further include a reference signal transistor, and the reference signal transistor includes: a gate, a first electrode and a second electrode; the first electrode of the reference signal transistor is configured such that a reference signal is written into the first electrode of the reference signal transistor, and the second electrode of the reference signal transistor is coupled to the second electrode plate and the gate of the driving transistor in a same pixel driving circuit. In the same pixel driving circuit, the reference signal transistor is located at a side of the data writing transistor away from the driving transistor.

Optionally, a reference signal connection line located at a side of the reference signal transistor in the second pixel driving circuit away from the data writing transistor in the second pixel driving circuit, wherein the reference signal connection line intersects the data line and is insulated from the data line, and the reference signal connection line is coupled to the reference signal transistor in the second pixel driving circuit and configured to provide the written reference signal.

Optionally, the gate of the reference signal transistor includes two second sub-gates coupled to each other, the reference signal transistor has a second groove, and the second groove separates the two second sub-gates.

Optionally, a gate of the data writing transistor in each of the first pixel driving circuit and the second pixel driving circuit includes two first sub-gates coupled to each other, the data writing transistor has a first groove, and the first groove separates the two first sub-gates, in the first pixel driving circuit, openings of the first groove and the second groove face away from each other.

Alternatively, a gate of the data writing transistor in each of the first pixel driving circuit and the second pixel driving circuit includes two first sub-gates coupled to each other, the data writing transistor has a first groove, and the first groove separates the two first sub-gates, in the second pixel driving circuit, openings of the first groove and the second groove face away from each other.

Alternatively, a gate of the data writing transistor in each of the first pixel driving circuit and the second pixel driving circuit includes two first sub-gates coupled to each other, the data writing transistor has a first groove, and the first groove separates the two first sub-gates, in the first pixel driving circuit, openings of the first groove and the second groove face away from each other; and in the second pixel driving circuit, openings of the first groove and the second groove face away from each other.

Optionally, the first pixel driving circuit further includes a first light-emitting control transistor, and the first light-emitting control transistor includes: a gate, a first electrode and a second electrode; the first electrode of the first light-emitting control transistor is configured such that a first light-emitting signal is written into the first electrode of the first light-emitting control transistor, and the second electrode of the first light-emitting control transistor is coupled to both a first electrode of the driving transistor in the first pixel driving circuit and a first electrode of the driving transistor in the second pixel driving circuit; the first light-emitting control transistor is located between the driving transistor in the first pixel driving circuit and the driving transistor in the second pixel driving circuit.

Alternatively, the first pixel driving circuit and the second pixel driving circuit each further include a second light-emitting control transistor, and the second light-emitting control transistor includes: a gate, a first electrode and a second electrode; the first electrode of the second light-emitting control transistor is configured such that a second light-emitting signal is written into the first electrode of the second light-emitting control transistor, and the second electrode of the second light-emitting control transistor is coupled to the first electrode of the driving transistor in a same pixel driving circuit; in the same pixel driving circuit, the second light-emitting control transistor is located at a side of the driving transistor away from the data writing transistor.

Optionally, the first pixel driving circuit further includes a first reset transistor, and the first reset transistor includes: a gate, a first electrode and a second electrode; the second electrode of the first reset transistor is configured such that a first initialization signal is written into the second electrode of the first reset transistor, and the first electrode of the first reset transistor is coupled to both a first electrode of the driving transistor in the first pixel driving circuit and a first electrode of the driving transistor in the second pixel driving circuit; the first reset transistor is located between the driving transistor in the first pixel driving circuit and the driving transistor in the second pixel driving circuit.

Alternatively, the first pixel driving circuit and the second pixel driving circuit each further include a second reset transistor, and the second reset transistor includes: a gate, a first electrode and a second electrode; the second electrode of the second reset transistor is configured such that a second initialization signal is written into the second electrode of the second reset transistor, and the first electrode of the second reset transistor is coupled to the second electrode of the driving transistor in a same pixel driving circuit; in the same pixel driving circuit, the second reset transistor is located at a side of the driving transistor away from the data writing transistor.

In a second aspect, a display apparatus is provided. The display apparatus includes the display panel.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art can obtain other drawings according to these accompanying drawings. In addition, the accompanying drawings to be described below may be regarded as schematic diagrams, and are not limitations on actual sizes of products, actual processes of methods and actual timings of signals involved in the embodiments of the present disclosure.

DETAILED DESCRIPTION

Figure 1:
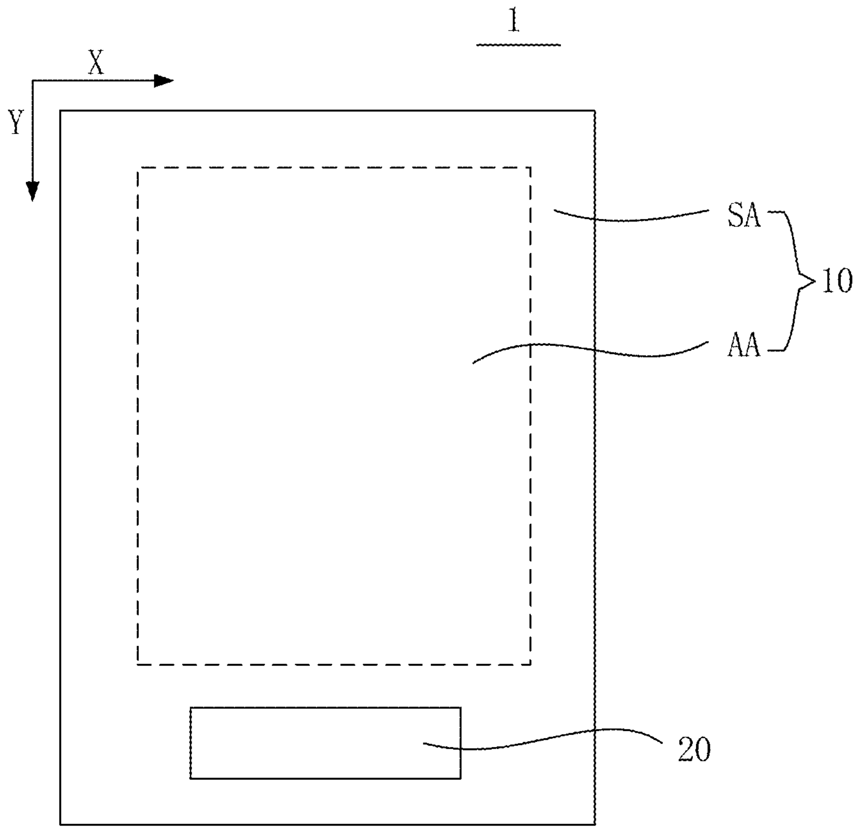
FIG. 1 is a structural diagram of a display apparatus provided in some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term “comprise” and other forms thereof such as the third-person singular form “comprises” and the present participle form “comprising” are construed as an open and inclusive meaning, i.e., “including, but not limited to”. In the description of the specification, the terms such as “one embodiment”, “some embodiments”, “exemplary embodiments”, “example”, “specific example” or “some examples” are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms such as “first” and “second” are used for descriptive purposes only, and are not to be construed as indicating or implying the relative importance or implicitly indicating the number of indicated technical features. Thus, a feature defined with “first” or “second” may explicitly or implicitly include one or more of the features. In the description of the embodiments of the present disclosure, the terms “a plurality of”, “the plurality of” and “multiple” each mean two or more unless otherwise specified.

In the description of some embodiments, terms such as “coupled” and “connected” and derivatives thereof may be used. For example, the term “connected” may be used in the description of some embodiments to indicate that two or more components are in direct physical or electrical contact with each other. As another example, the term “coupled” may be used in the description of some embodiments to indicate that two or more components are in direct physical or electrical contact. However, the term “coupled” or “communicatively coupled” may also mean that two or more components are not in direct contact with each other, but still cooperate or interact with each other. The embodiments disclosed herein are not necessarily limited to the context herein.

The phrase “at least one of A, B and C” has the same meaning as the phrase “at least one of A, B or C”, and they both include the following combinations of A, B and C: only A, only B, only C, a combination of A and B, a combination of A and C, a combination of B and C, and a combination of A, B and C.

The phrase “A and/or B” includes the following three combinations: only A, only B, and a combination of A and B.

As used herein, depending on the context, the term “if” is optionally construed as “when”, “in a case where”, “in response to determining” or “in response to detecting”. Similarly, depending on the context, the phrase “if it is determined” or “if [a stated condition or event] is detected” is optionally construed as “in a case where it is determined”, “in response to determining”, “in a case where [the stated condition or event] is detected”, or “in response to detecting [the stated condition or event]”.

The phrase “applicable to” or “configured to” used herein means an open and inclusive expression, which does not exclude devices that are applicable to or configured to perform additional tasks or steps.

In addition, the phase “based on” used is meant to be open and inclusive, since a process, step, calculation or other action that is “based on” one or more of the stated conditions or values may, in practice, be based on additional conditions or value exceeding those stated.

As used herein, terms such as “about”, “substantially”, or “approximately” include a stated value and an average value within an acceptable range of deviation of a particular value. The acceptable range of deviation is determined by a person of ordinary skill in the art in view of the measurement in question and errors associated with the measurement of a particular quantity (i.e., the limitations of the measurement system).

As used herein, the term such as “parallel”, “perpendicular”, or “equal” includes a stated condition and a condition similar to the stated condition. A range of the similar condition is within an acceptable range of deviation, and the acceptable range of deviation is determined by a person of ordinary skill in the art in view of measurement in question and errors associated with the measurement of a particular quantity (i.e., the limitations of the measurement system). For example, the term "parallel" includes absolute parallelism and approximate parallelism, and an acceptable range of deviation of the approximate parallelism may be, for example, a deviation within 5°. The term "perpendicular" includes absolute perpendicularity and approximate perpendicularity, and an acceptable range of deviation of the approximate perpendicularity may also be, for example, a deviation within 5°. The term "equal" includes absolute equality and approximate equality, and an acceptable range of deviation of approximate equality may be, for example, that a difference between two equals is less than or equal to 5% of any one of the two equals.

It will be understood that, in a case where a layer or component is referred to as being on another layer or a substrate, it may be that the layer or component is directly on the another layer or substrate; or it may be that intermediate layer(s) exist between the layer or component and the another layer or substrate.

Exemplary embodiments are described herein with reference to sectional views and/or plan views as idealized exemplary drawings. In the drawings, thicknesses of layers and sizes of regions are enlarged for clarity. Variations in shape relative to the accompanying drawings due to, for example, manufacturing technologies and/or tolerances may be envisaged. Therefore, the exemplary embodiments should not be construed as being limited to the shapes of the regions shown herein, but including shape deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in an apparatus, and are not intended to limit the scope of the exemplary embodiments.

Some embodiments of the present disclosure provide a display apparatus. The display apparatus is a product with an image display function. For example, the product may be any one of a display, a television, a billboard, a digital photo frame, a laser printer with a display function, a telephone, a mobile phone, a personal digital assistant (PDA), a digital camera, a portable camcorder, a viewfinder, a navigator, a vehicle, a large-area wall, a home appliance, an information search device (e.g., a business inquiry device of departments such as an electronic government, a bank, a hospital and an electric power department), a monitor, etc.

FIG. 1 is a structural diagram of the display apparatus.

Referring to FIG. 1, the display apparatus 1 generally includes a display panel 10. For example, the display panel 10 may be an organic light-emitting diode (OLED) display panel, a quantum dot light-emitting diode (QLED) display panel, or a tiny light-emitting diode (a tiny LED, including a mini LED or a micro LED) display panel, etc.

The display panel 10 has a display area AA and a non-display area SA. The display area AA of the display panel 10 is an area capable of displaying images. The non-display area SA may be located at at least one side (e.g., one side or multiple sides) of the display area AA. For example, the non-display area SA may be disposed around the display area AA.

For example, the display area AA may be in a shape of a rectangle, or may be in a shape of a rounded rectangle or another shape similar to the rectangle. Based on this, the display area AA has two sides intersecting each other (for example, the two sides are perpendicular to each other). For the convenience of description, a Cartesian coordinate system is established with extending directions of the two sides as X-axis and Y-axis, respectively.

The display apparatus 1 may further include other component(s), such as a display driver integrated circuit (DDIC) 20. The DDIC 20 is coupled to the display panel 10. For example, the DDIC 20 may be bonded to the display panel 10, and is configured to provide data signals to the display panel 10.

Figure 2:
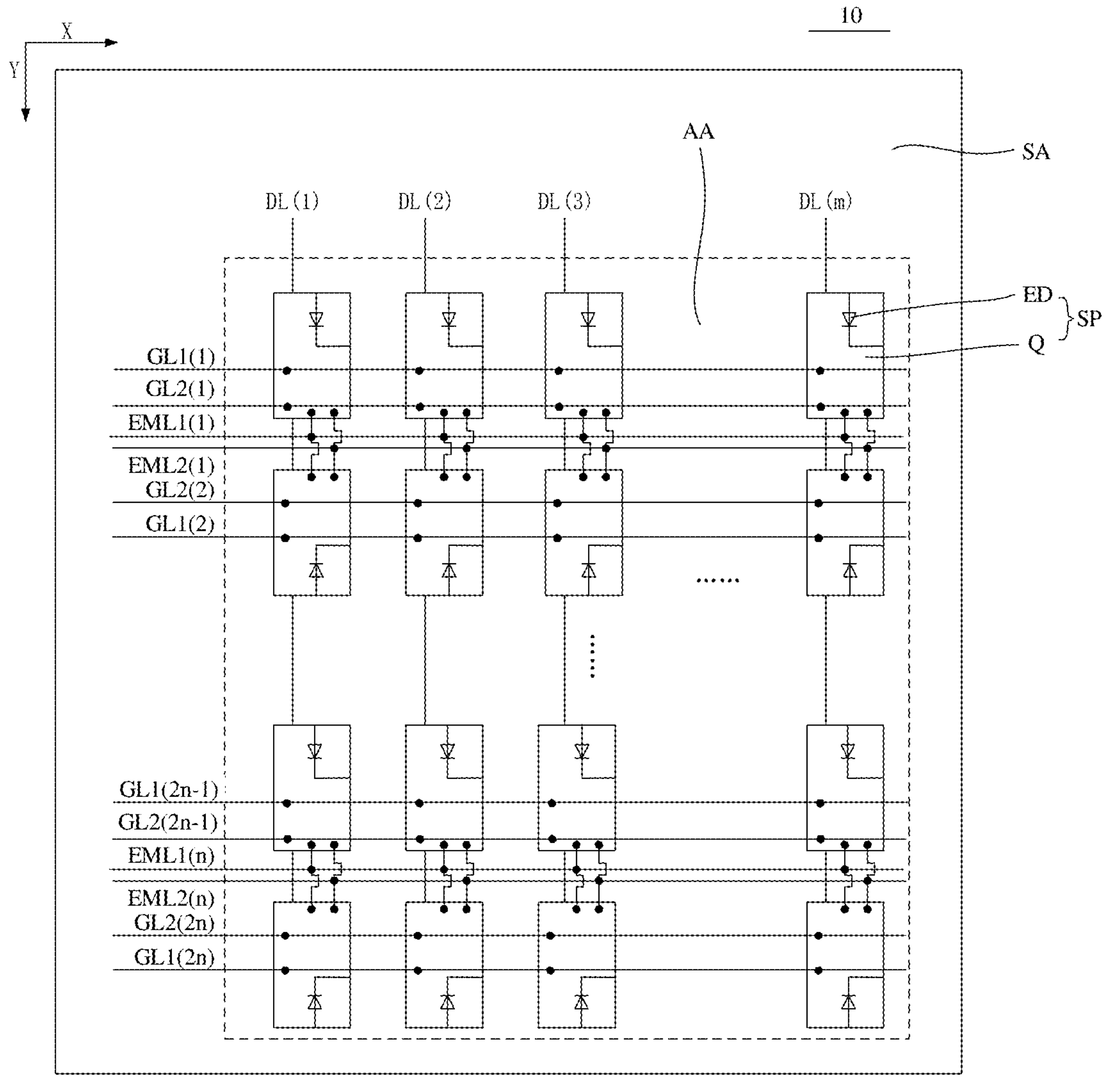
FIG. 2 is a circuit diagram of a pixel driving circuit provided in some embodiments of the present disclosure.

Referring to FIG. 2, the display panel is provided in embodiments of the present disclosure.

The display panel 10 includes a plurality of sub-pixels SP located in the display area AA. The plurality of sub-pixels SP include first sub-pixels for emitting light of a first color, second sub-pixels for emitting light of a second color, and third sub-pixels for emitting light of a third color. The first color, the second color and the third color are three primary colors (e.g., red, green and blue). For example, the display panel 10 may include: red sub-pixels R, green sub-pixels G and blue sub-pixels B.

With continued reference to FIG. 2, a (e.g., each) sub-pixel SP may include a pixel driving circuit Q and light-emitting device(s) ED coupled to the pixel driving circuit Q. The pixel driving circuit Q is configured to drive the light-emitting device ED to emit light according to a received data signal. For example, the data signal may be a voltage signal. Thus, luminance of the light-emitting device ED varies with a voltage value of the data signal.

For example, a light-emitting device ED in the red sub-pixel is configured to emit red light, a light-emitting device ED in the blue sub-pixel is configured to emit blue light, and a light-emitting device ED in the green sub-pixel is configured to emit green light. As another example, light-emitting devices ED in the red sub-pixel, green sub-pixel and blue sub-pixel are each configured to emit white light. In this case, the display panel 10 may further include: a red filter located in the red sub-pixel, a green filter located in the green sub-pixel, and a blue filter located in the blue sub-pixel.

A light-emitting device ED may adopt one or more of an organic light-emitting diode, a quantum dot light-emitting diode and a tiny light-emitting diode.

The light-emitting device ED includes: a cathode, an anode, and a light-emitting functional layer located between the cathode and the anode. The light-emitting functional layer may include, for example, a light-emitting layer, a hole transport layer (HTL) located between the light-emitting layer and the anode, and an electron transport layer (ETL) located between the light-emitting layer and the cathode. Of course, according to needs, in some embodiments, a hole injection layer (HIL) may further be provided between the hole transport layer (HTL) and the anode, and an electron injection layer (EIL) may further be provided between the electron transport layer (ETL) and the cathode. In addition, an electron blocking layer (EBL) may further be provided between the hole transport layer (HTL) and the light-emitting layer, and a hole blocking layer (HBL) may further be provided between the electron transport layer (ETL) and the light-emitting layer.

For example, the anode may be made of a transparent conductive material with a high work function, and an electrode material of the anode may include one or more of indium tin oxide (ITO), indium zinc oxide (IZO), indium gallium oxide (IGO), gallium zinc oxide (GZO), zinc oxide (ZnO), indium oxide ($In_2O_3$), aluminum zinc oxide (AZO) and carbon nanotubes. For example, the cathode may be made of a material with high conductivity and low work function, and an electrode material of the cathode may include: an alloy such as magnesium aluminum (MgAl)

alloy or lithium aluminum (LiAl) alloy, or a simple metal such as magnesium (Mg), aluminum (Al), lithium (Li) or silver (Ag). A material of the light-emitting layer may be determined according to a color of light emitted by the light-emitting layer. For example, the material of the light-emitting layer includes a fluorescent light-emitting material or a phosphorescent light-emitting material. As another example, the light-emitting layer may adopt a doping system. That is, a dopant material is mixed into a host light-emitting material to obtain a usable light-emitting material. For example, the host light-emitting material may be any one of a metal compound material, a derivative of anthracene, an aromatic diamine compound, a triphenylamine compound, an aromatic triamine compound, a derivative of biphenyldiamine, and a triarylamine polymer.

A plurality of pixel driving circuits Q may be distributed in an array. For example, the plurality of pixel driving circuits may be in an array of 2n rows and m columns, where n is greater than or equal to 1, and m is greater than or equal to 1. For example, m is greater than or equal to 2. For example, a line of pixel driving circuits Q distributed along a first direction X (e.g., a direction indicated by the X-axis) is referred to as a same row of pixel driving circuits Q. A line of pixel driving circuits Q distributed along a second direction Y (e.g., a direction indicated by the Y-axis) is referred to as a same column of pixel driving circuits Q.

A pixel driving circuit Q may include electronic components, such as a plurality of transistors and capacitor(s). For example, each pixel driving circuit may include three transistors and a capacitor, which constitute 3T1C (i.e., one driving transistor, two switching transistors and one capacitor). The pixel driving circuit may also include more than three transistors and at least one capacitor, such as 4T1C (i.e., one driving transistor, three switching transistors and one capacitor), 5T1C (i.e., one driving transistor, four switching transistors, and one capacitor) or 7T2C (i.e., one driving transistor, six switching transistors and two capacitors).

The transistor may be a thin film transistor (TFT), a metal oxide semiconductor (MOS) or another switching device with same characteristics, and embodiments of the present disclosure are all described by taking the thin film transistor as an example.

The thin film transistor includes: a gate, a first electrode and a second electrode. The first electrode of the thin film transistor is one of a source and a drain, and the second electrode of the thin film transistor is the other of the source and the drain. Since the source and the drain of the thin film transistor can have a same function, the source and the drain may not be specifically distinguished.

Transistors in the pixel driving circuit provided in embodiments of the present disclosure may all be N-type transistors. It will be noted that the embodiments of the present disclosure include but are not limited thereto. For example, one or more transistors in the pixel driving circuit provided in embodiments of the present disclosure may be P-type transistor(s), as long as electrodes of the P-type transistor are connected to another transistor with reference to electrodes of a corresponding N-type transistor in the embodiments of the present disclosure, and a corresponding high level or low level is applied to a corresponding gate.

With continued reference to FIG. 2, the display panel may further include various signal lines coupled to the plurality of pixel driving circuits.

For example, the various signal lines include a plurality of data lines (a data line DL(1) to a data line DL(m)). In a case where pixel driving circuits in a k-th column (representing any one column) are coupled to a data line DL(k), the data line DL(k) is configured to provide a data signal to the k-th column of pixel driving circuits, where k is greater than or equal to 1 and less than or equal to m.

For example, the various signal lines further include a plurality of first scanning signal lines (a first scanning signal line GL1(1) to a first scanning signal line GL1(2*n*)). In a case where pixel driving circuits in an i-th row (representing any one row) are coupled to a first scanning signal line GL1(*i*), the first scanning signal line GL1(*i*) is configured to provide a first scanning signal to the i-th row of pixel driving circuits, where i is greater than or equal to 1 and less than or equal to (2n−1).

For example, the various signal lines further include a plurality of second scanning signal lines (a second scanning signal line GL2(1) to a second scanning signal line GL2(2*n*)). In a case where the pixel driving circuits in the i-th row are coupled to a second scanning signal line GL2(*i*), the second scanning signal line GL2(*i*) is configured to provide a second scanning signal to the i-th row of pixel driving circuits.

For example, the various signal lines further include a plurality of first light-emitting control signal lines (a first light-emitting control signal line EML1(1) to a first light-emitting control signal line EML1(*n*)). In a case where the pixel driving circuits in the i-th row and pixel driving circuits in a j-th row are all coupled to a first light-emitting control signal line EML1(*h*), the first light-emitting control signal line EML1(*h*) is configured to provide a first light-emitting control signal to the i-th row of pixel driving circuits and the j-th row of pixel driving circuits, where j is greater than or equal to 2 and less than or equal to 2n, and j is not equal to i.

For example, the various signal lines further include a plurality of second light-emitting control signal lines (a second light-emitting control signal line EML2(1) to a second light-emitting control signal line EML2(*n*)). In a case where the pixel driving circuits in the i-th row and the pixel driving circuits in the j-th row are all coupled to a second light-emitting control signal line EML2(*h*), the second light-emitting control signal line EML2(*h*) is configured to provide a second light-emitting control signal to the i-th row of pixel driving circuits and the j-th row of pixel driving circuits.

Figure 3:
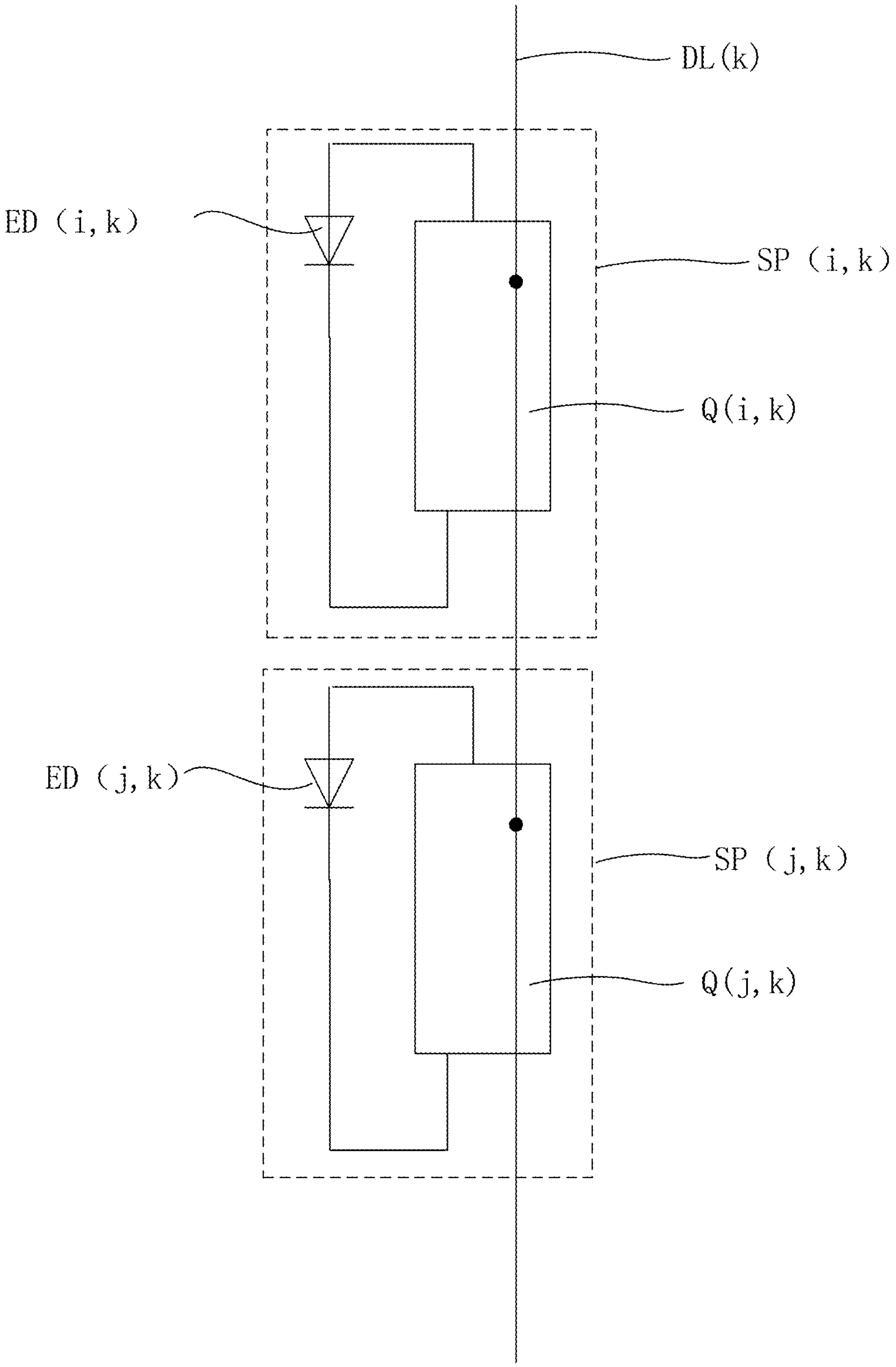
FIG. 3 is a structural diagram of a pixel driving circuit group provided in some embodiments of the present disclosure.

Two pixel driving circuits that are located in a same column and in two adjacent rows will be described in detail below. Referring to FIG. 3, the two pixel driving circuits are referred to as a first pixel driving circuit Q(i, k) and a second pixel driving circuit Q(j, k), and the two pixel driving circuits may be coupled to a same data line DL(k). In addition, a light-emitting device ED coupled to the first pixel driving circuit Q(i, k) is referred to as a first light-emitting device ED(i, k), and a light-emitting device ED coupled to the second pixel driving circuit Q(j, k) is referred to as a second light-emitting device ED(j, k). For other pixel driving circuits, reference may also be made to relevant description of the first pixel driving circuit Q(i, k) and the second pixel driving circuit Q(j, k) here.

Figure 4:
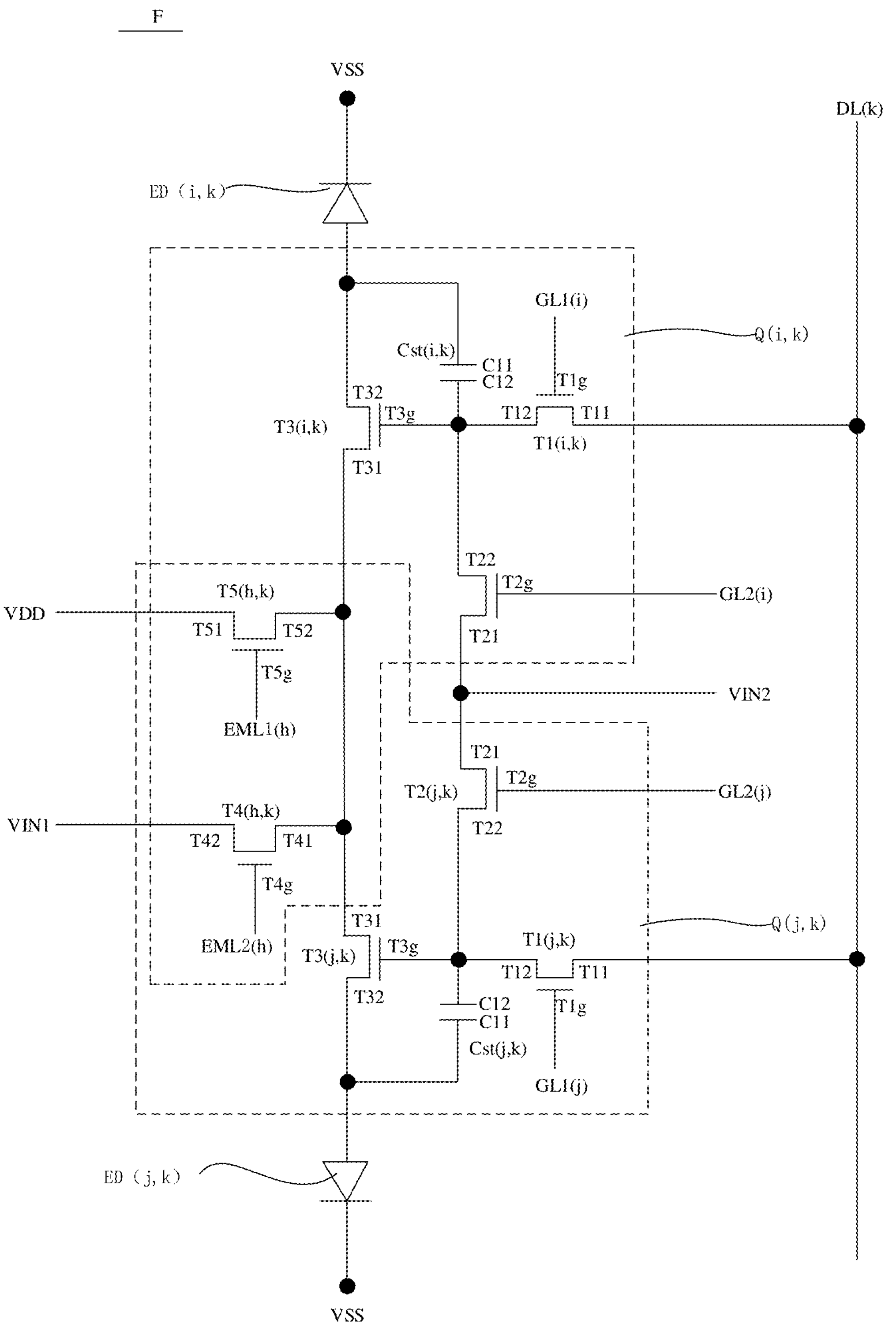
FIG. 4 is a circuit diagram of a pixel driving circuit group provided in some embodiments of the present disclosure.
Figure 5:
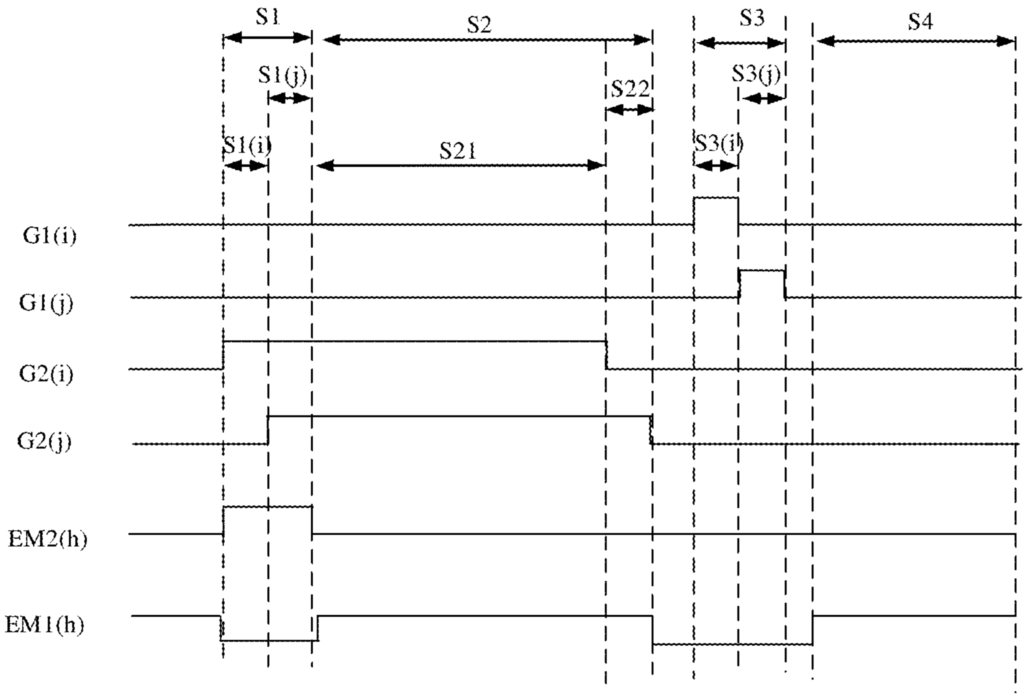
FIG. 5 is a signal timing diagram of the pixel driving circuit group F in FIG. 4.

FIG. 4 is a specific circuit diagram of FIG. 3; FIG. 5 is a signal timing diagram of the circuit shown in FIG. 4.

Referring to FIG. 4, the first pixel driving circuit Q(i, k) and the second pixel driving circuit Q(j, k) each include a plurality of electronic components (i.e., elements). For example, the first pixel driving circuit Q(i, k) and the second pixel driving circuit Q(j, k) each include: a capacitor Cst, a driving transistor T3 and a data writing transistor T1. For FIG. 4, in a case where the mark (i, k) is included in a reference sign of an electronic component, the electronic component belongs to the first pixel driving circuit; in a case where the mark (j, k) is included in a reference sign of another electronic component, the another electronic component belongs to the second pixel driving circuit. As an example, i is an odd number. In this case, a sum of i and 1 is equal to j, and j is equal to 2h (i+1=j=2h).

For a capacitor Cst(i, k), a driving transistor T3(*i, k*) and a data writing transistor T1(*i, k*) in the first pixel driving circuit Q(i, k), functions thereof and connection relationships therebetween are described below.

The driving transistor T3(*i, k*) includes: a gate T3*g*, a first electrode T31 and a second electrode T32, and the driving transistor T3(*i, k*) is configured to, in response to a signal applied to the gate T3*g*, control a current flowing through the first electrode T31 and the second electrode T32. For example, the signal applied to the gate T3*g* may be the data signal (a voltage of which is Vdate) or a compensated data signal (a voltage of which is (Vdate+Vth)), where Vth is a threshold voltage of the driving transistor T3(*i, k*). For example, the first electrode T31, the second electrode T32 of the driving transistor T3(*i, k*) and the first light-emitting device ED(i, k) are connected in series between a first power supply voltage terminal VDD and a second power supply voltage terminal VSS, so that the driving transistor T3(*i, k*) may control a magnitude of a current flowing through the first light-emitting device ED(i, k).

The data writing transistor T1(*i, k*) is coupled to the data line DL(k) and the driving transistor T3(*i, k*), and the data writing transistor T1(*i, k*) is configured to transmit the data signal applied to the data line DL(k) to the driving transistor T3(*i, k*).

The data writing transistor T1(*i, k*) includes: a gate T1*g*, a first electrode T11 and a second electrode T12. For example, the first electrode T11 of the data writing transistor T1(*i, k*) is coupled to the data line DL(k), and the second electrode T12 of the data writing transistor T1(*i, k*) is coupled to the gate T3*g* of the driving transistor T3(*i, k*), and the gate T1*g* of the data writing transistor T1(*i, k*) is coupled to the first scanning signal line GL1(*i*). The data writing transistor T1(*i, k*) is configured to, in response to the first scanning signal provided by the first scanning signal line GL1(*i*), transmit the data signal applied to the data line DL(k) to the gate T3*g* of the driving transistor T3(*i, k*).

The capacitor Cst(i, k) has a first electrode plate C11 and a second electrode plate C12 that are opposite. The first electrode plate C11 of capacitor Cst(i, k) is coupled to both the second electrode T32 of driving transistor T3(*i, k*) and the first light-emitting device ED(i, k). For example, the first electrode plate C11 of the capacitor Cst(i, k) is coupled to an anode of the first light-emitting device ED(i, k). The second electrode plate C12 of the capacitor Cst(i, k) is coupled to the gate T3*g* of the driving transistor T3(*i, k*).

Similarly, a first electrode T31, a second electrode T32 of a driving transistor T3(*j, k*) in the second pixel driving circuit Q(j, k) and the second light-emitting device ED(j, k) may be connected in series, so that the driving transistor T3(*j, k*) may control a magnitude of a current flowing through the second light-emitting device ED(j, k). For specific description of the driving transistor T3(*j, k*), reference may be made to the relevant description of the driving transistor T3(*i, k*) in the first pixel driving circuit Q(i, k) above.

A data writing transistor T1(*j, k*) in the second pixel driving circuit Q(j, k) is configured to, in response to a first scanning signal provided by a first scanning signal line GL1(*j*), transmit the data signal applied to the data line DL(k) to a gate T3*g* of the driving transistor T3(*j, k*). For specific description of the data writing transistor T1(*j, k*), reference may be made to the relevant description of the data writing transistor T1(*i, k*) in the first pixel driving circuit Q(i, k) above.

In addition, a capacitor Cst(j, k) in the second pixel driving circuit Q(j, k) has a first electrode plate C11 and a second electrode plate C12 that are opposite. The first electrode plate C11 of the capacitor Cst(j, k) is coupled to both the second electrode T32 of the driving transistor T3(*j, k*) and the second light-emitting device ED(j, k). For example, the first electrode plate C11 of the capacitor Cst(j, k) is coupled to an anode of the second light-emitting device ED(j, k). The second electrode plate C12 of the capacitor Cst(j, k) is coupled to the gate T3*g* of the driving transistor T3(*j, k*).

In some embodiments, as shown in FIG. 4, the first pixel driving circuit Q(i, k) further includes a reference signal transistor T2(*i, k*). The reference signal transistor T2(*i, k*) includes: a gate T2*g*, a first electrode T21 and a second electrode T22. For example, the first electrode T21 of the reference signal transistor T2(*i, k*) is coupled to a reference signal line VIN2, and is configured such that a reference signal is written into the first electrode T21. The second electrode T22 of the reference signal transistor T2(*i, k*) is coupled to both the second electrode plate C12 of the capacitor Cst(i, k) and the gate T3*g* of the driving transistor T3(*i, k*). The gate T2*g* of the reference signal transistor T2(*i, k*) is coupled to the second scanning signal line GL2(*i*). The reference signal transistor T2(*i, k*) is configured to, in response to the second scanning signal applied to the second scanning signal line GL2(*i*), transmit the reference signal applied to the reference signal line VIN2 to the gate T3*g* of the driving transistor T3(*i, k*) and the second electrode plate C12 of the capacitor Cst(i, k).

A reference signal transistor T2(*j, k*) in the second pixel driving circuit Q(j, k) is configured to, in response to a second scanning signal applied to a second scanning signal line GL2(*j*), transmit the reference signal applied to the reference signal line VIN2 to the gate T3*g* of the driving transistor T3(*j, k*) and the second electrode plate C12 of the capacitor Cst(j, k). For specific description of the reference signal transistor T2(*j, k*), reference may be made to the relevant description of the reference signal transistor T2(*i, k*) in the first pixel driving circuit Q(i, k) above.

In some embodiments, as shown in FIG. 4, the first pixel driving circuit Q(i, k) further includes a first reset transistor T4(*h, k*). The first reset transistor T4(*h, k*) may be shared by the first pixel driving circuit Q(i, k) and the second pixel driving circuit Q(j, k). The first reset transistor T4(*h, k*) includes: a gate T4*g*, a first electrode T41 and a second electrode T42.

For example, the second electrode T42 of the first reset transistor T4(*h, k*) is configured such that an initialization signal is written into the second electrode T42. For example, the second electrode T42 of the first reset transistor T4(*h, k*) is coupled to an initial signal line VIN1. The first electrode T41 of the first reset transistor T4(*h, k*) is coupled to both the first electrode T31 of the driving transistor T3(*i, k*) in the first pixel driving circuit Q(i, k) and the first electrode T31 of the driving transistor T3(*j, k*) in the second pixel driving circuit Q(j, k). The gate T4*g* of the first reset transistor T4(*h, k*) is coupled to the second light-emitting control signal line EML2(*h*). The first reset transistor T4(*h, k*) is configured to, in response to the second light-emitting control signal applied to the second light-emitting control signal line EML2(*h*), transmit the initialization signal applied to the initial signal line VIN1 to the first electrode T31 of the driving transistor T3(i, k) in the first pixel driving circuit Q(i, k) and the first electrode T31 of the driving transistor T3(j, k) in the second pixel driving circuit Q(j, k).

In some embodiments, as shown in FIG. 4, the first pixel driving circuit Q(i, k) further includes a first light-emitting transistor T5(h, k). The first light-emitting transistor T5(h, k) may be shared by the first pixel driving circuit Q(i, k) and the second pixel driving circuit Q(j, k). The first light-emitting transistor T5(h, k) includes: a gate T5g, a first electrode T51 and a second electrode T52.

For example, the first electrode T51 of the first light-emitting control transistor T5(h, k) is configured such that a light-emitting signal is written into the first electrode T51. For example, the first electrode T51 of the first light-emitting control transistor T5(h, k) is coupled to the first power supply voltage terminal VDD. The second electrode T52 of the first light-emitting control transistor T5(h, k) is coupled to the first electrode T31 of the driving transistor T3(i, k) in the first pixel driving circuit Q(i, k) and the first electrode T31 of the driving transistor T3(j, k) in the second pixel driving circuit Q(j, k). The gate T5g of the first light-emitting control transistor T5(h, k) is coupled to the first light-emitting control signal line EML1(h). The first light-emitting control transistor T5(h, k) is configured to, in response to the first light-emitting control signal applied to the first light-emitting control signal line EML1(h), transmit a voltage applied to the first power supply voltage terminal VDD to the first electrode T31 of the driving transistor T3(i, k) in the first pixel driving circuit Q(i, k) and the first electrode T31 of the driving transistor T3(j, k) in the second pixel driving circuit Q(j, k). That is, the first light-emitting control transistor T5(h, k) may control on or off of a path, which is from the first power supply voltage terminal VDD to the second power supply voltage terminal VSS and passes through the first light-emitting device ED(i, k), so that a light-emitting duration of the first light-emitting device ED(i, k) can be controlled. As a result, luminance of the first light-emitting device ED(i, k) (brightness of a sub-pixel to which the first light-emitting device ED(i, k) belongs) is controlled during a process where the display panel displays a frame of image. Similarly, the first light-emitting control transistor T5(h, k) may also control a light-emitting duration of the second light-emitting device ED(j, k).

A method for driving a pixel driving circuit group F (including the first pixel driving circuit and the second pixel driving circuit) in FIG. 4 will be described below. For example, the driving method may include the following phases to compensate for the written data signal. Referring to FIGS. 4 and 5, the method for driving the pixel driving circuit group F includes following steps.

In a first phase S1, for the pixel driving circuit group F, the second electrode T32 of the driving transistor T3(i, k) and the second electrode T32 of the driving transistor T3(j, k) are reset, and the reference signal is written into both the gate T3g of the driving transistor T3(i, k) and the gate T3g of the driving transistor T3(j, k).

The first phase S1 includes a first sub-phase S1(i) and a second sub-phase S1(j).

In the first sub-phase S1(i), for the first pixel driving circuit Q(i, k), the reference signal transistor T2(i, k) and the first reset transistor T4(h, k) are both turned on, and the data writing transistor T1(i, k) and the first light-emitting transistor T5(h, k) may be turned off.

The reference signal transistor T2(i, k) transmits, in response to a voltage of the second scanning signal G2(i) provided by the second scanning signal line GL2(i) being an effective voltage (e.g., at a high level), a reference signal (a voltage of which is Vref) applied to the reference signal line VIN2 to the gate T3g of the driving transistor T3(i, k), so that the driving transistor T3(i, k) is turned on. The first reset transistor T4(h, k) transmits, in response to a voltage of the second light-emitting control signal EM2(h) transmitted by the second light-emitting control signal line EML2(h) being an effective voltage (e.g., at a high level), the initialization signal applied to the initialization signal line VIN1 to the first electrode T31 of the driving transistor T3(i, k). As a result, the second electrode T32 of the driving transistor T3(i, k) is reset.

In the second sub-phase S1(j), for the second pixel driving circuit Q(j, k), the reference signal transistor T2(j, k) is turned on, and the data writing transistor T1(j, k) and the first light-emitting transistor T5(h, k) may be turned off. The reference signal transistor T2(j, k) transmits, in response to a voltage of the second scanning signal G2(j) provided by the second scanning signal line GL2(j) being an effective voltage (e.g., at a high level), the reference signal (the voltage of which is Vref) applied to the reference signal line VIN2 to the gate T3g of the driving transistor T3(j, k), so that the driving transistor T3(j, k) is turned on. In addition, the first reset transistor T4(h, k) continues to be turned on. As a result, the initialization signal is transmitted to the second electrode T32 of the driving transistor T3(j, k), and thus the second electrode T32 of the driving transistor T3(j, k) is reset.

In a second phase S2, for the pixel driving circuit group F, threshold voltage compensation is performed on each of the second electrode of the driving transistor T3(i, k) and the second electrode of the driving transistor T3(j, k).

The second phase S2 may include a first sub-phase S21 and a second sub-phase S22.

In the first sub-phase S21, the reference signal transistor T2(i, k), the driving transistor T3(i, k), the reference signal transistor T2(j, k) and the driving transistor T3(j, k) continue to be turned on, the first light-emitting transistor T5(h, k) is turned on, and the first reset transistor T4(h, k), the data writing transistor T1(j, k) and the data writing transistor T1(i, k) are turned off.

The first light-emitting transistor T5(h, k) transmits, in response to a voltage of the first light-emitting signal EM1 (h) provided by the first light-emitting control signal line EML1(h) being an effective voltage (e.g., at a high level), the voltage applied to the first power supply voltage terminal VDD to both the first electrode T31 of the driving transistor T3(i, k) and the first electrode T31 of the driving transistor T3(j, k), so that both the capacitor Cst(i, k) and the capacitor Cst(j, k) are charged. In this way, a voltage of the second electrode T32 of the driving transistor T3(i, k) (which may also be referred to as a voltage of the first electrode plate C11 of the capacitor Cst(i, k), or a voltage of the anode of the first light-emitting device ED(i, k)) reaches (Vref−Vth) (Vth being the threshold voltage of the third transistor T3(i, k)). Similarly, a voltage of the second electrode T32 of the driving transistor T3(j, k) reaches (Vref−Vth) (Vth being a threshold voltage of the third transistor T3(j, k)).

In the second sub-phase S22, the first light-emitting transistor T5(h, k) and the driving transistor T3(i, k) continue to be turned on, and the reference signal transistor T2(i, k), the first reset transistor T4(h, k) and the data writing transistor T1(i, k) are turned off.

Since a voltage across two terminals of the capacitor Cst(i, k) does not change suddenly, the voltage of the second electrode T32 of the driving transistor T3(i, k) continues to be maintained at (Vref−Vth).

In a third phase S3, for the pixel driving circuit group F, the data signal is written into the gate T3*g* of the driving transistor T3(*i, k*) and the gate T3*g* of the driving transistor T3(*j, k*).

The third phase S3 includes a first sub-phase S3(*i*) and a second sub-phase S3(*j*).

In the first sub-phase S3(*i*), the data writing transistor T1(*i, k*) and the driving transistor T3(*i, k*) are turned on, and the reference signal transistor T2(*i, k*), the first light-emitting transistor T5(*h, k*) and the first reset transistor T4(*h, k*) may be turned off.

The data writing transistor T1(*i, k*) transmits, in response to a voltage of the first scanning signal G1(*i*) provided by the first scanning signal line GL1(*i*) being an effective voltage (e.g., at a high level), a data signal (a voltage of which is Vdata(i, k)) applied to the data line DL(k) to the gate T3*g* of the driving transistor T3(*i, k*). A voltage difference between the gate T3*g* and the second electrode T32 of the driving transistor T3(*i, k*) (which may be, for example, referred to as a gate-source voltage of the driving transistor T3(*i, k*)) is (Vdata(i, k)−(Vref−Vth)). That is, the voltage difference is a voltage difference across the two terminals of the capacitor Cst(i, k).

In the second sub-phase S3(*j*), the data writing transistor T1(*j, k*) and the driving transistor T3(*j, k*) are turned on, and the reference signal transistor T2(*j, k*), the first light-emitting transistor T5(*h, k*) and the first reset transistor T4(*h, k*) are turned off.

The data writing transistor T1(*j, k*) transmits, in response to a voltage of the first scanning signal G1(*j*) provided by the first scanning signal line GL1(*j*) being an effective voltage (e.g., at a high level), a data signal (a voltage of which is Vdata(j, k)) applied to the data line DL(k) to the gate T3*g* of the driving transistor T3(*j, k*). A voltage difference between the gate T3*g* and the second electrode T32 of the driving transistor T3(*j, k*) is (Vdata(j, k)−(Vref−Vth)). That is, the voltage difference is a voltage difference across two terminals of the capacitor Cst(j, k).

In a fourth phase S4, only the driving transistors T3 and the first light-emitting transistor T5(*h, k*) are turned on. The first light-emitting transistor T5(*h, k*) transmits, in response to the voltage of the first light-emitting signal EM1(*h*) provided by the first light-emitting control signal line EML1(*h*) being the effective voltage (e.g., at the high level), the voltage applied to the first power supply voltage terminal VDD to both the first electrode T31 of the driving transistor T3(*i, k*) and the first electrode T31 of the driving transistor T3(*j, k*), so that the first light-emitting device ED(i, k) and the second light-emitting device ED(j, k) both emit light.

Since the voltage across two terminals of a capacitor Cst does not change suddenly, a voltage difference between the gate T3*g* and the second electrode T32 of the driving transistor T3 is maintained at a state in the third phase. As a result, magnitudes of currents flowing through the first light-emitting device ED(i, k) and the second light-emitting device ED(j, k) are independent of their respective threshold voltages.

Figure 6:
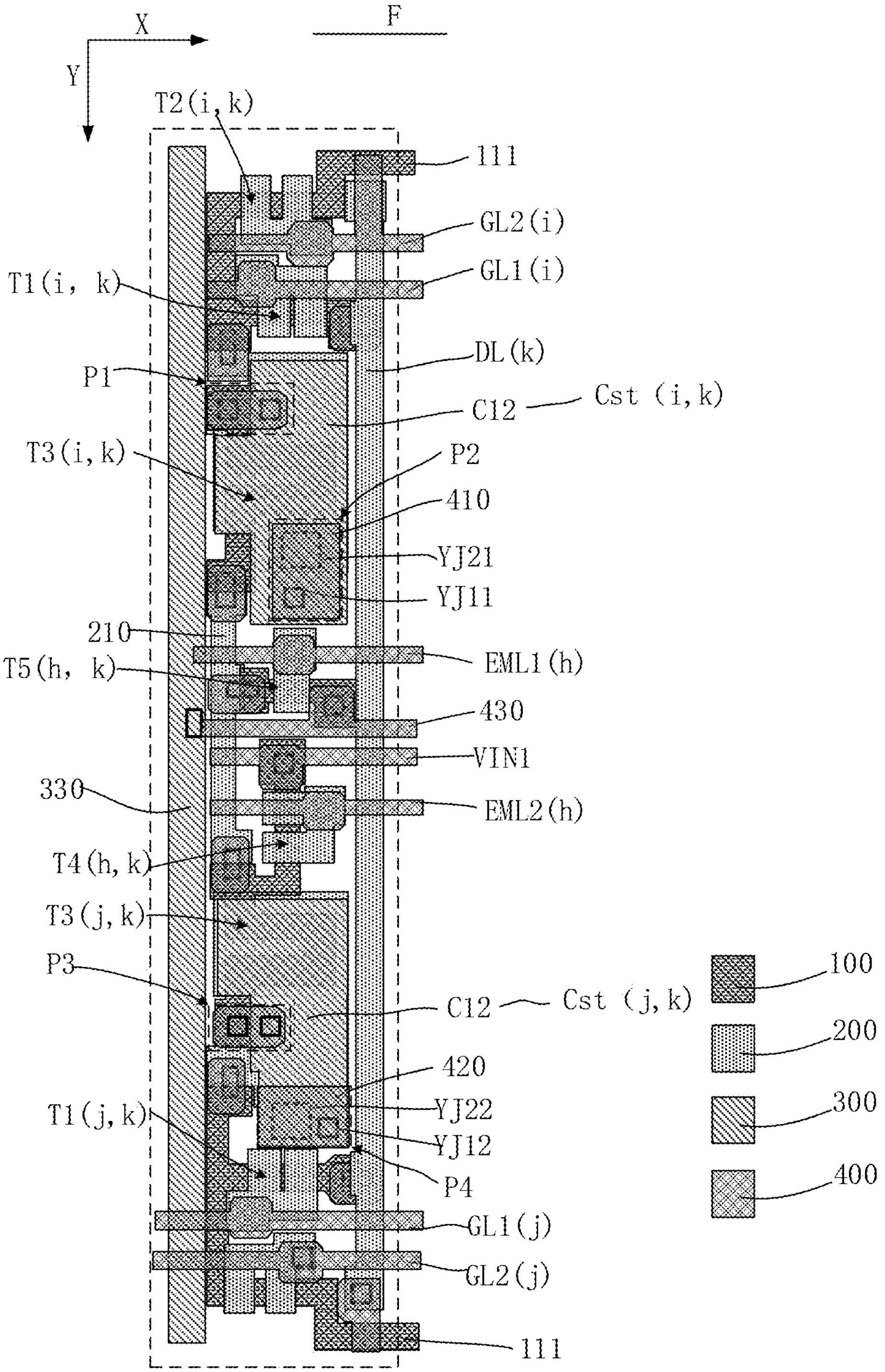
FIG. 6 is a structural diagram of FIG. 4.

FIG. 6 is a structural diagram of the pixel driving circuit group F shown in FIG. 4.

In some embodiments, referring to FIG. 6, the display panel may include a base substrate and a plurality of layers disposed on the base substrate. For example, the plurality of layers may include a first pattern layer 100, a second pattern layer 200, a third pattern layer 300, a first insulating layer YJ1, a fourth pattern layer 400 and a second insulating layer YJ2 that are disposed in a direction away from the base substrate. These layers are used to form pixel driving circuit groups F shown in FIG. 4.

In embodiments of the present disclosure, the "pattern layer" may be a layer structure that includes specific patterns and is formed by forming at least one film layer by using a same film forming process, and then performing a patterning process by using the at least one film layer. Depending on different specific patterns, the patterning process may include multiple gluing, exposure, development or etching processes, and the specific patterns in the formed layer structure may be continuous or discontinuous, and these specific patterns may also be at different heights or have different thicknesses.

With continued reference to FIG. 6, the data writing transistor T1(*i, k*) in the first pixel driving circuit, the driving transistor T3(*i, k*) in the first pixel driving circuit, the driving transistor T3(*j, k*) in the second pixel driving circuit and the data writing transistor T1(*j, k*) in the second pixel driving circuit are sequentially arranged along an extending direction of the data line DL(k).

For example, the extending direction of the data line DL(k) may be the second direction Y, or may be the first direction X, or may be an oblique direction. For example, an included angle of 45° exists between the extending direction and the first direction X. The drawing is illustrated by taking an example in which the extending direction of the data line DL(k) is the second direction Y. The data writing transistor T1(*i, k*) and the driving transistor T3(*i, k*) in the first pixel driving circuit, and the driving transistor T3(*j, k*) and the data writing transistor T1(*j, k*) in the second pixel driving circuit may be sequentially arranged along a positive direction (a direction indicated by the arrow) of the second direction Y, or may be sequentially arranged along a negative direction (a direction opposite to the positive direction) of the second direction Y. In this way, for the first pixel driving circuit and the second pixel driving circuit, the driving transistor T3(*i, k*) and the driving transistor T3(*j, k*) are located between the data writing transistor T1(*i, k*) and the data writing transistor T1(*j, k*), which may mean that, the data writing transistor T1(*i, k*) and the data writing transistor T1(*j, k*) are substantially symmetrical in position relative to the driving transistor T3(*i, k*) and the driving transistor T3(*j, k*). Since the driving transistor T3(*i, k*) and the driving transistor T3(*j, k*) are close to each other, there is no need to cross or bypass other transistors in a case where the driving transistor T3(*i, k*) and the driving transistor T3(*j, k*) need to be coupled. As a result, convenience is provided for the coupling of the two driving transistors, which helps reduce a space occupied by a single pixel driving circuit.

With continued reference to FIG. 6, for the first pixel driving circuit Q(i, k), the first electrode plate C11 of the capacitor Cst(i, k) is coupled to the second electrode T32 of the driving transistor T3(*i, k*) at a first coupling position P1, and the first electrode plate C11 of the capacitor Cst(i, k) is coupled to the first light-emitting device at a second coupling position P2; the second coupling position P2 is located at a side of the first coupling position P1 away from the data writing transistor T1(*i, k*). For the second pixel driving circuit Q(j, k), the first electrode plate C11 of the capacitor Cst(j, k) is coupled to the second electrode T32 of the driving transistor T3(*j, k*) at a third coupling position P3, and the first electrode plate C11 of the capacitor Cst(j, k) is coupled to the second light-emitting device at a fourth coupling position P4; the fourth coupling position P4 is located between the third coupling position P3 and the data writing transistor T1(*j, k*).

For example, the first coupling position P1 and the second coupling position P2 are sequentially arranged along the positive direction of the second direction Y, and the third coupling position P3 and the fourth coupling position P4 are also sequentially arranged along the positive direction of the second direction Y, which may mean that, a relative position between the first coupling position P1 and the second coupling position P2 in the extending direction of the data line (for example, the second coupling position P2 is located at a side of the first coupling position P1 in the positive direction of the second direction Y) is the same as a relative position between the third coupling position P3 and the fourth coupling position P4 in the extending direction of the data line (for example, the fourth coupling position P4 is located at a side of the third coupling position P3 in the positive direction of the second direction Y). For example, the extending direction of the data line is the second direction Y. The first coupling position P1 and the second coupling position P2 are sequentially arranged along the positive direction of the second direction Y, and the third coupling position P3 and the fourth coupling position P4 are also sequentially arranged along the positive direction of the second direction Y, which may also mean that, the second coupling position P2 and the fourth coupling position P4 are asymmetrically arranged relative to the first coupling position P1 and the third coupling position P3.

Thus, based on the description above that the data writing transistor T1(*i, k*) and the data writing transistor T1(*j, k*) are substantially symmetrical in position relative to the driving transistor T3(*i, k*) and the driving transistor T3(*j, k*), an easy-to-think scheme is that, the second coupling position P2 and the fourth coupling position P4 are also symmetrically arranged relative to the first coupling position P1 and the third coupling position P3 (for example, the second coupling position P2 and the four coupling position P4 are located between the first coupling position P1 and the third coupling position P3). Compared with the scheme, the second coupling position P2 and the fourth coupling position P4 are arranged asymmetrically in the embodiments, which helps make a distance between the second coupling position P2 and the fourth coupling position P4 in the pixel driving circuit group F be guaranteed.

For a column of pixel driving circuits, the second coupling position P2 and the fourth coupling position P4 may be arranged alternately. Thus, a distance between every two adjacent positions (the second coupling position P2 and the fourth coupling position P4) for coupling light-emitting devices in the second direction Y may be substantially equal. The distance between the two coupling positions (the second coupling position P2 and the fourth coupling position P4) in the second direction Y refers to a distance between geometric centers (or geometric gravity centers) of the two coupling positions (the second coupling position P2 and the fourth coupling position P4) in the second direction Y. For example, in a case where the number of pixel driving circuits in the column is 2n, (2n−1) distances can be obtained, and the (2n−1) distances are denoted by a distance L(1) to a distance L(2n−1). A ratio of a difference between a maximum value and a minimum value in these distances to an average value of these distances is, for example, less than or equal to 10%, 8%, 5%, 4% or 2%.

Figure 7:
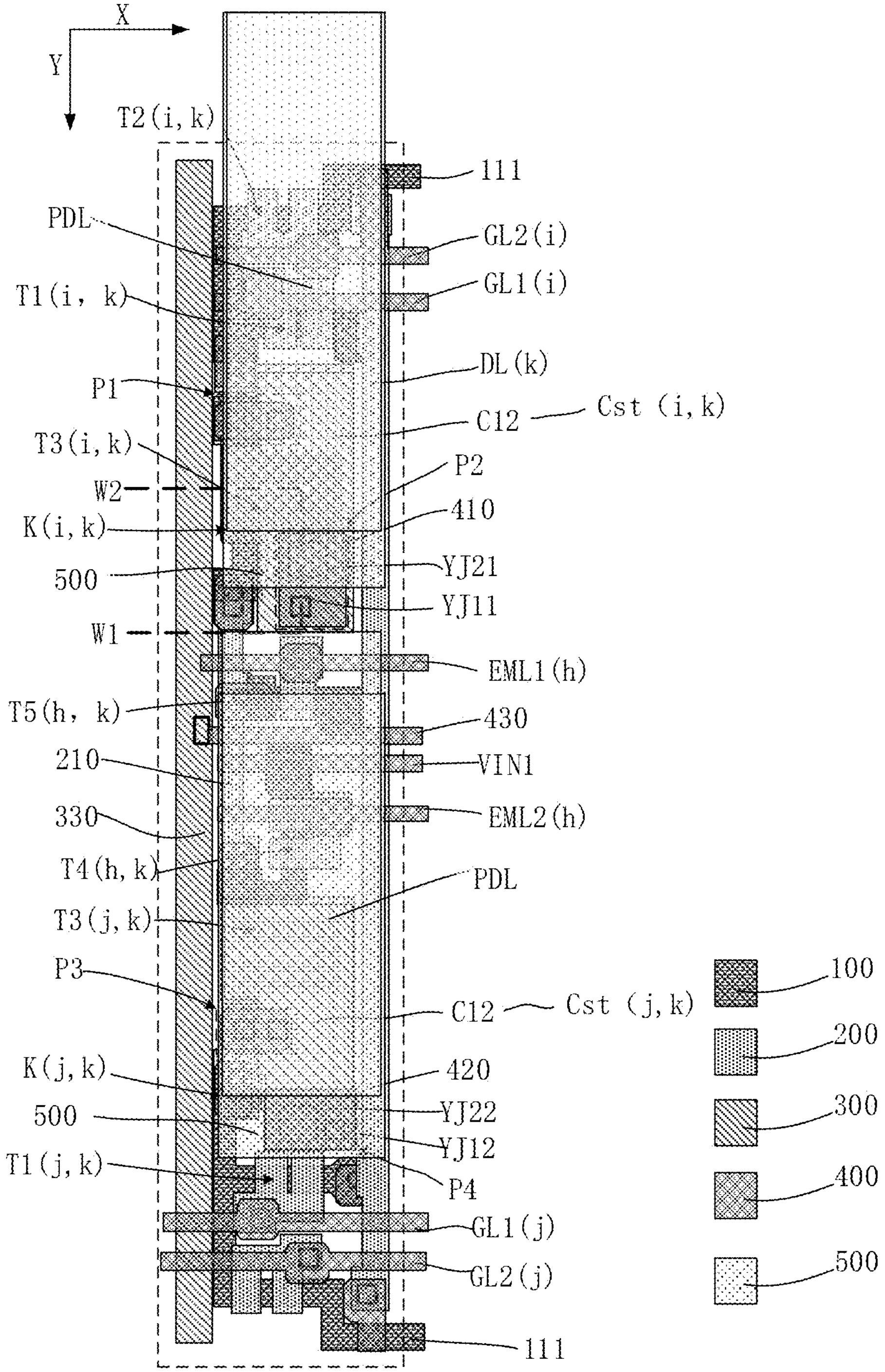
FIG. 7 is a structural diagram showing anodes of light-emitting devices and a pixel defining layer provided in some embodiments of the present disclosure.

FIG. 7 is a structural diagram showing anodes of the light-emitting devices added on the basis of FIG. 6.

In some embodiments, referring to FIG. 7, the display panel may further include a fifth pattern layer 500 and a pixel defining layer PDL that are disposed on a side of the second insulating layer YJ2 away from the base substrate. For example, the pixel defining layer PDL is located on a side of the fifth pattern layer 500 away from the base substrate. Of course, it is also possible to form the pixel defining layer PDL first and then form the fifth pattern layer 500.

The fifth pattern layer 500 includes electrodes (such as anodes) of a plurality of light-emitting devices ED. For example, the fifth pattern layer 500 includes the anode of the first light-emitting device ED(i, k) and the anode of the second light-emitting device ED(j, k) in FIG. 7.

The pixel defining layer PDL has a plurality of pixel openings K. Each sub-pixel may have a pixel opening K to expose at least a portion of an electrode (e.g., an anode) of a light-emitting device ED in the sub-pixel. A light-emitting functional layer may be formed in each pixel opening K by processes such as evaporation; then, an electrode layer covering light-emitting functional layers may be formed, and the electrode layer serves as another electrode (e.g., a cathode) of all light-emitting devices.

A pixel opening of a sub-pixel (e.g., a sub-pixel including the second pixel driving circuit) may be located between the second coupling position P2 and the fourth coupling position P4, so that recesses of these coupling positions can be avoided. In combination with the description above, in the embodiments, the space occupied by the single pixel driving circuit can be reduced, and the distance between the second coupling position P2 and the fourth coupling position P4 can be guaranteed. As a result, the pixel opening of the sub-pixel will not be affected as much as possible.

In some embodiments, referring to FIG. 6, the first light-emitting control transistor T5(*h, k*) is located at a side of the driving transistor T3(*i, k*) away from the data writing transistor T1(*i, k*). Similarly, the first light-emitting control transistor T5(*h, k*) is located at a side of the driving transistor T3(*j, k*) away from the data writing transistor T1(*j, k*). It may also mean that, the first light-emitting control transistor T5(*h, k*) is located between the driving transistor T3(*i, k*) and the driving transistor T3(*j, k*). Since the first light-emitting control transistor T5(*h, k*) is shared by the first pixel driving circuit Q(i, k) and the second pixel driving circuit Q(j, k), by arranging the position of the first light-emitting control transistor T5(*h, k*) in such a way, it is possible to reduce crossing lines as much as possible, and thus simplify the structure.

In some embodiments, referring to FIG. 6, the first reset transistor T4(*h, k*) is located at the side of the driving transistor T3(*i, k*) away from the data writing transistor T1(*i, k*). Similarly, the first reset transistor T4(*h, k*) is located at the side of the driving transistor T3(*j, k*) away from the data writing transistor T1(*j, k*). It may also mean that, the first reset transistor T4(*h, k*) is located between the driving transistor T3(*i, k*) and the driving transistor T3(*j, k*). Since the first reset transistor T4(*h, k*) is shared by the first pixel driving circuit Q(i, k) and the second pixel driving circuit Q(j, k), by arranging the position of the first reset transistor T4(*h, k*) in such a way, it is possible to reduce crossing lines as much as possible, and thus simplify the structure.

It will be noted that, both the first light-emitting control transistor T5(*h, k*) and the first reset transistor T4(*h, k*) may be located between the driving transistor T3(*i, k*) and the driving transistor T3(*j, k*). In some possible implementation examples, the first light-emitting control transistor T5(*h, k*) and the first reset transistor T4(*h, k*) are sequentially arranged along the extending direction of the data line (e.g., the positive direction of the second direction Y). It may also mean that, the first reset transistor T4(*h, k*) is closer to the driving transistor T3(*j, k*) than the first light-emitting control transistor T5(*h, k*). In some other possible implementation examples, the first reset transistor T4(*h, k*) and the first light-emitting control transistor T5(*h, k*) are sequentially arranged along the extending direction of the data line (e.g., the positive direction of the second direction Y).

In some embodiments, referring to FIG. 6, for each of the first pixel driving circuit and the second pixel driving circuit, the reference signal transistor T2 is located at a side of the data writing transistor T1 away from the driving transistor T3. For the first pixel driving circuit, the reference signal transistor T2(*i, k*) is located at a side of the data writing transistor T1(*i, k*) away from the driving transistor T3(*i, k*); for the second pixel driving circuit, the reference signal transistor T2(*j, k*) is located at a side of the data writing transistor T1(*j, k*) away from the driving transistor T3(*j, k*). It may mean that, the reference signal transistor T2(*i, k*) and the reference signal transistor T2(*j, k*) are located outside the data writing transistor T1(*i, k*) and the data writing transistor T1(*j, k*), and are not between the data writing transistor T1(*i, k*) and the data writing transistor T1(*j, k*). In this case, it may mean that the reference signal transistor T2(*i, k*) and the reference signal transistor T2(*j, k*) are also symmetrically arranged relative to the data writing transistor T1(*i, k*) and the data writing transistor T1(*j, k*).

In the display panel, extending directions of the reference signal line VIN2 and the data line DL(k) may be the same. That is, the reference signal line VIN2 and the data line DL(k) may both extend along the second direction Y. Thus, the first electrode T21 of the reference signal transistor T2(*i, k*) and the first electrode T21 of the reference signal transistor T2(*j, k*) are both coupled to the reference signal line VIN2, and a connection line (which is referred to as a reference signal connection line 111 below) is needed to transmit a signal to the two transistors. Based on this, two reference signal transistors T2 that are close to each other in two adjacent pixel driving circuit groups F may be coupled to the reference signal line VIN2 through one reference signal connection line 111. For example, a reference signal transistor T2(*i*+2, k) and the reference signal transistor T2(*j, k*) may be coupled to one reference signal connection line 111. The reference signal transistor T2(*i*+2, k) is a reference signal transistor in a pixel driving circuit in the (i+2)-th row and the k-th column. It may also mean that, the reference signal transistor T2(*i*+2, k) is located in a next row of the reference signal transistor T2(*j, k*) in the positive direction of the second direction Y. As another example, the reference signal transistor T2(*i, k*) and a reference signal transistor T2(*j*−2, k) may be coupled to one reference signal connection line 111. The reference signal transistor T2(*j*−2, k) is a reference signal transistor in a pixel driving circuit in an (j−2)-th row and the k-th column. In this way, the number of reference signal connection lines 111 may be reduced, which helps to reduce the space occupied by the single pixel driving circuit, thereby increasing a pixel density (pixels per inch, abbreviated as PPI) of the display panel.

For example, the reference signal line 111 extends along the first direction X. That is, the reference signal line 111 may be linear.

FIGS. 8, 10, 14 and 15 are schematic diagrams of some layers included in FIG. 7, and the layers in FIG. 7 will be described in detail below with reference to FIGS. 8, 10, 14 and 15.

The base substrate may be a flexible base substrate. For example, the flexible base substrate may be made of polyimide (PI) or the like. As another example, the base substrate may be a hard base substrate. The hard base substrate may be made of glass, sapphire, or a hard resin material.

Figure 8:
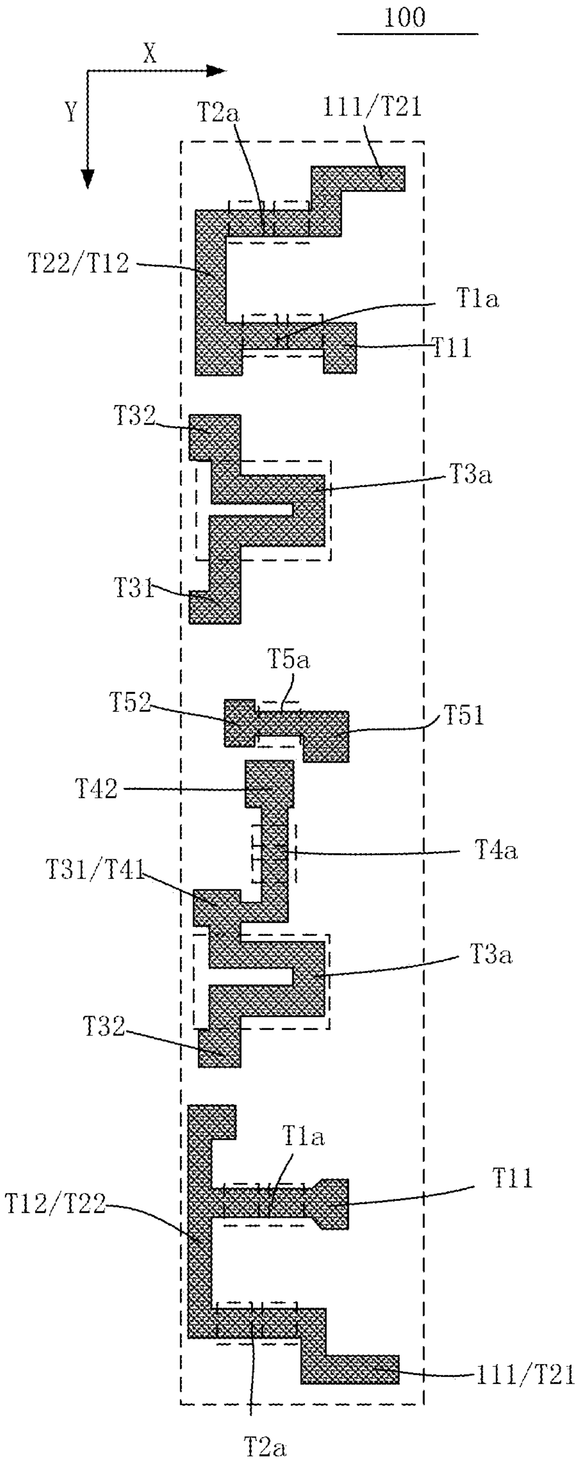
FIG. 8 is a structural diagram of a first pattern layer in FIG. 6.
Figure 10:
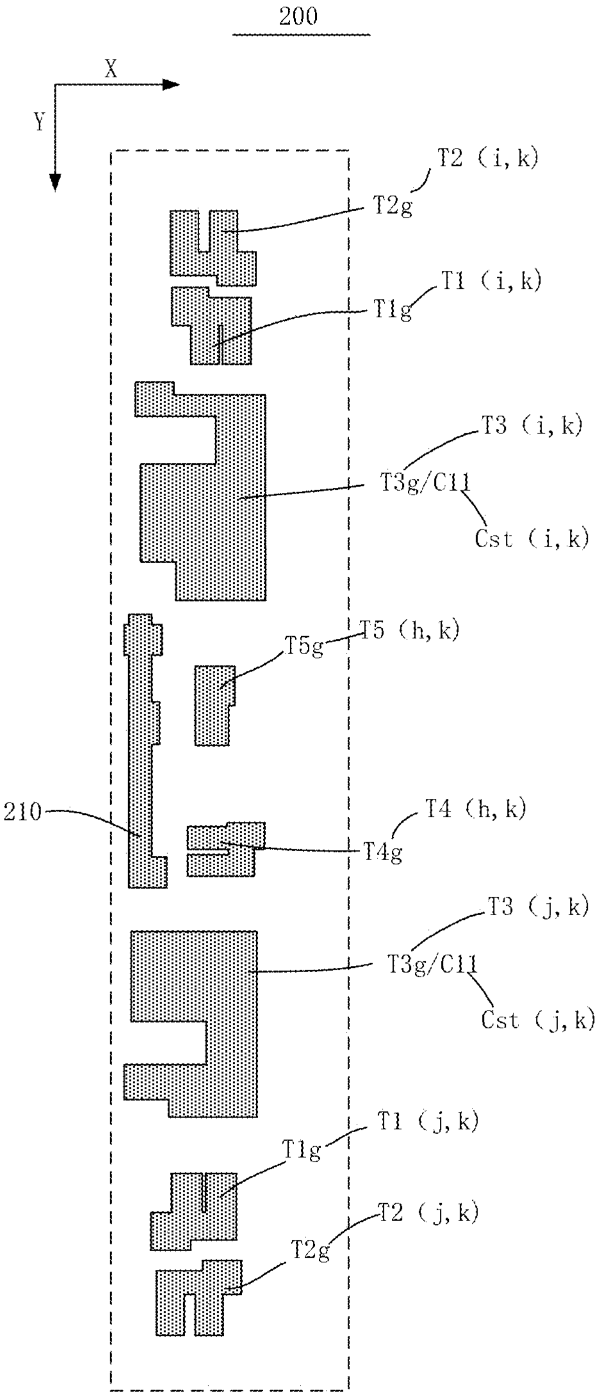
FIG. 10 is a structural diagram of a second pattern layer in FIG. 6.
Figure 13:
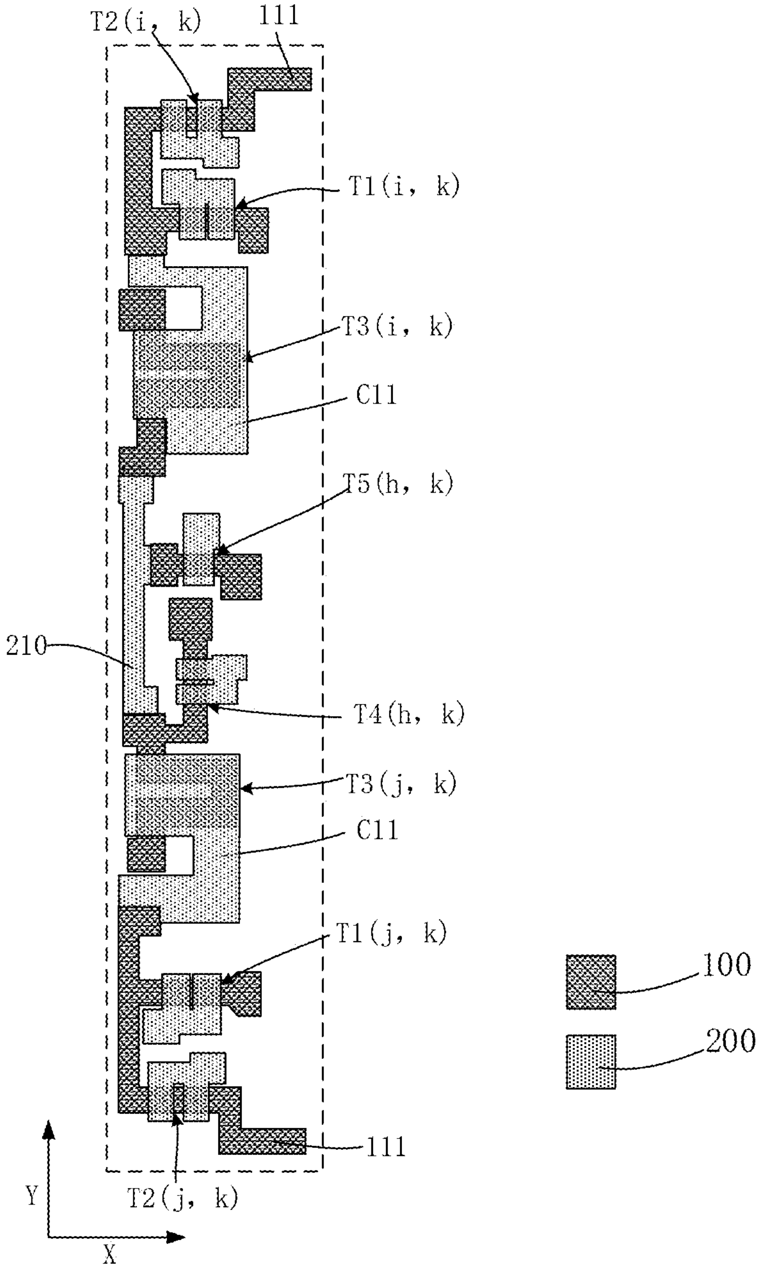
FIG. 13 is a structural diagram of transistors formed by FIGS. 8 and 10.

After the first pattern layer 100 shown in FIG. 8 and the second pattern layer 200 shown in FIG. 10 are formed on the base substrate, a structure shown in FIG. 13 may be obtained. That is, at least transistors in FIG. 7 may be formed. In addition, some auxiliary patterns (e.g., reference signal connection lines 111) may also be formed.

In order to simplify the description, if special descriptions are required for different devices or signal lines, marks are added; and if there is no special description, the mark is not added. For example, the data writing transistor T1(*i, k*) and the data writing transistor T1(*j, k*) are different devices, and the data writing transistor T1 below may mean the data writing transistor T1(*i, k*) or the data writing transistor T1(*j, k*). Similarly, simplified descriptions are made for the driving transistor T3, the reference signal transistor T2, the first reset transistor T4, the first light-emitting transistor T5, the capacitor Cst, the first scanning signal line GL1, the second scanning signal line GL2, a second reset transistor T6, a second light-emitting transistor T7, etc.

Referring to FIG. 8, the first pattern layer 100 has a plurality of active regions and a plurality of conductive regions. The conductive regions may include regions on both sides of each active region; a region of another pattern (e.g., the reference signal connection line 111) is also included in the conductive regions. A material in the active region is semiconductor, such as polysilicon. A material in the conductive region is semiconductor doped with ions, such as polysilicon doped with phosphorus (P) ions, or polysilicon doped with boron (B) ions. Regions of the first pattern layer 100 shown in FIG. 8 being opposite to the second pattern layer 200 shown in FIG. 10 in the thickness direction of the display panel are active regions, and other regions of the first pattern layer 100 shown in FIG. 8 are conductive regions.

The first pattern layer 100 may include: an active layer of each of the plurality of transistors, and a first electrode and a second electrode located on both sides of the active layer. The active layer of each transistor corresponds to at least one (e.g., one or two) active regions. The first electrode or the second electrode of each transistor corresponds to at least one (e.g., one) conductive region.

For example, with continued reference to FIG. 8, the first pattern layer 100 may include: an active layer T3*a*, a first electrode T31 and a second electrode T32 of each of driving transistors T3, and an active layer T1*a*, a first electrode T11 and a second electrode T12 of each of data writing transistor T1. The first pattern layer 100 may further include: an active layer T2*a*, a first electrode T21 and a second electrode T22 of each of reference signal transistors T2, an active layer T4*a*, a first electrode T41 and a second electrode T42 of each of first reset transistors T4, an active layer T5*a*, a first electrode T51 and a second electrode T52 of each of light-emitting transistors T5, and reference signal connection lines 111.

For example, a reference signal connection line 111 and a first electrode T21 of a reference signal transistor T2 are in a same conductive region; a second electrode T22 of the reference signal transistor T2 and a second electrode T12 of a signal writing transistor T1 are in a same conductive region; and the first electrode T41 of the first reset transistor T4(*h, k*) and the first electrode T31 of the driving transistor T3(*j, k*) are in a same conductive region.

Figure 9:
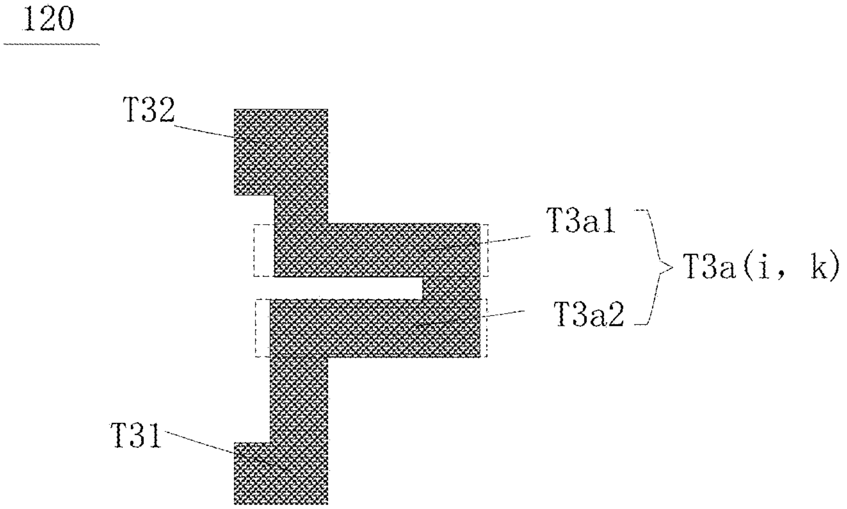
FIG. 9 is a structural diagram of an active layer of a driving transistor in FIG. 8.

For example, referring to FIG. 9, the active layer T3*a* of the driving transistor T3 includes a plurality of semiconductor segments T3*a*1 that are sequentially distributed at intervals along the extending direction of the data line DL(k) and coupled to each other. The plurality of semiconductor segments T3*a*1 are substantially parallel to each other. The plurality of semiconductor segments T3*a*1 are coupled by connecting conductive segment(s). In some examples, an extending direction of the semiconductor segment is in the first direction X. An included angle may exist between the extending direction of the semiconductor segment and the first direction X, and the included angle is in a range of 0° to 5°, inclusive. In some other examples, the number of semiconductor segments may be two, or at least two.

In a possible implementation manner, the second coupling position P2 is located on a side of a plurality of semiconductor segments T3*a*1 in the first pixel driving circuit Q(i, k) away from the first coupling position P1, and the fourth coupling position P4 is located on a side of a plurality of semiconductor segments T3*a*1 in the second pixel driving circuit Q(j, k) proximate to the third coupling position P3. In some examples, the plurality of semiconductor segments T3*a*1 in the first pixel driving circuit Q(i, k) are located between the first coupling position P1 and the second coupling position P2, and the third coupling position P3 is located between the fourth coupling position P4 and the plurality of semiconductor segments T3*a*1 in the second pixel driving circuit Q(j, k).

Referring to FIG. 10, the second pattern layer 200 is made of a conductive material. For example, the conductive material may be a metal material, and the metal material may be metal simple substance (such as gold, silver and copper) and alloy thereof. The conductive material may also be a non-metallic material, and the non-metallic material may be graphite or the like.

The second pattern layer 200 may include: a gate T3*g* of each of the driving transistors T3, and a gate T1*g* of each of the data writing transistors T1. The second pattern layer 200 may further include: a gate T2*g* of each of the reference signal transistors T2, a gate T4*g* of each of the first reset transistors T4(*h, k*), a gate T5*g* of each of the first light-emitting transistors T5(*h, k*) and connection lines (first connection lines 210).

Figure 11:
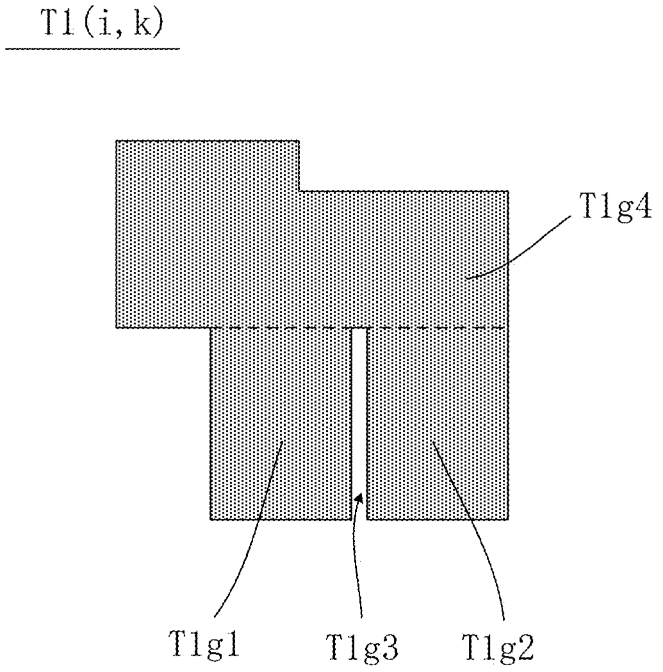
FIG. 11 is a structural diagram of a gate of a data writing transistor in FIG. 10.
Figure 12:
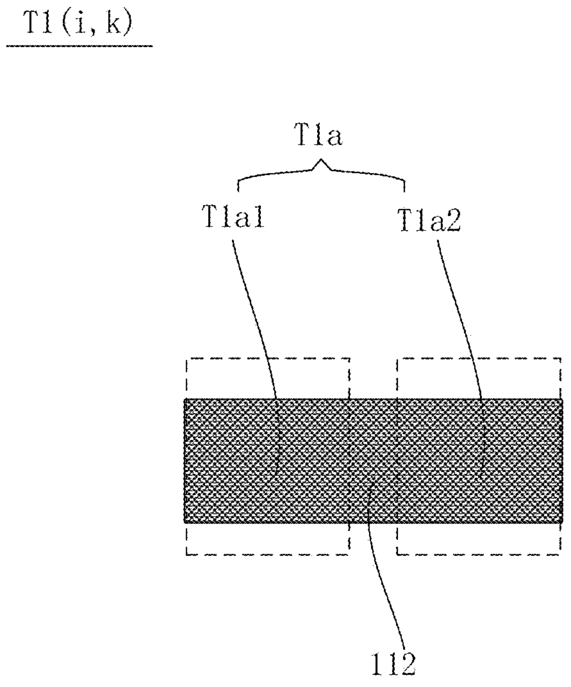
FIG. 12 is a structural diagram of an active layer of a data writing transistor in FIG. 8.

FIG. 11 is a structural diagram of the gate of the data writing transistor T1(*i, k*); FIG. 12 is a structural diagram of the active layer of the data writing transistor T1(*i, k*).

For example, referring to FIG. 11, the data writing transistor T1 has a double-gate structure, which reduces the electric leakage of the data writing transistor T1. The gate T1*g* of the data writing transistor T1 includes two first sub-gates coupled to each other, the data writing transistor T1 has a first groove T1*g*3, and the first groove T1*g*3 separates the two first sub-gates.

Referring to FIGS. 11 and 12, the active layer of the data writing transistor T1 has two active regions (referred to as a first active region T1*a*1 and a second active region T1*a*2), and the two active regions are connected through a conductive region (referred to as a first conductive region 112) therebetween. The gate T1*g* of the data writing transistor T1 includes two first sub-gates (referred to as a first sub-gate T1*g*1 and a first sub-gate T1*g*2) distributed along a direction in which the two active regions are arranged, and a connection portion T1*g*4 for connecting the two first sub-gates (the first sub-gate T1*g*1 and the first sub-gate T1*g*2). In the thickness direction of the display panel, the two active regions are opposite to the two first sub-gates, respectively (that is, the first active region T1*a*1 is opposite to the first sub-gate T1*g*1, and the second active region T1*a*2 is opposite to the first sub-gate T1*g*2), and thus a double-gate structure is formed. For example, the gate T1*g* of the data writing transistor T1 may have the first groove T1*g*3, and the first groove T1*g*3 can separate the two first sub-gates (the first sub-gate T1*g*1 and the first sub-gate T1*g*2).

It will be noted that, the dotted line in FIG. 11 is for distinguishing the first sub-gates and the conductive portion T1*g*4, and the first sub-gates and the conductive portion T1*g*4 may be arranged to be a one-piece structure.

For example, as shown in FIG. 10, the reference signal transistor T2 and the first reset transistor T4(*h, k*) may each have a double-gate structure. The gate T2*g* of the reference signal transistor T2 includes two second sub-gates coupled to each other; the reference signal transistor T2 has a second groove T2*g*3, and the second groove T2*g*3 separates the two second sub-gates (the second sub-gate T2*g*1 and the second sub-gate T2*g*2). The gate T4*g* of the first reset transistor T4(*h, k*) includes two third sub-gates coupled to each other; the first reset transistor T4(*h, k*) has a third groove, and the third groove separates the two third sub-gates.

Structures of the reference signal transistor T2 and the first reset transistor T4(*h, k*) are similar to the structure of the data writing transistor T1. Therefore, for the structures of the reference signal transistor T2 and the first reset transistor T4(*h, k*), reference may be made to the relevant description of the data writing transistor T1.

For example, in the case where the gate T1*g* of the data writing transistor T1 has the first groove T1*g*3, openings of the first groove T1*g*3 and the second groove in the first pixel driving circuit face away from each other. In this way, the arrangement of the first scanning signal line GL1 and the second scanning signal line GL2 in the same pixel driving circuit is facilitated, and the lines will not be close to each other.

For example, in the case where the gate T1*g* of the data writing transistor T1 has the first groove T1*g*3, openings of the first groove T1*g*3 and the second groove in the second pixel driving circuit face away from each other.

For example, in the case where the gate T1*g* of the data writing transistor T1 has the first groove T1*g*3, the openings of the first groove T1*g*3 and the second groove in the first pixel driving circuit face away from each other, and the openings of the first groove T1*g*3 and the second groove in the second pixel driving circuit face away from each other.

For example, an opening of the first groove T1*g*3 in the first pixel driving circuit Q(i, k) and an opening of the first groove T1*g*3 in the second pixel driving circuit Q(j, k) face each other.

For example, the opening of the second groove of the reference signal transistor T2(*i, k*) and the opening of the second groove of the reference signal transistor T2(*j, k*) face away from each other.

For example, the second electrode plate C12 of the capacitor Cst and the gate T3*g* of the driving transistor T3 are in a same pattern. The second electrode plate C12 of the capacitor Cst(i, k) and the second electrode plate C12 of the capacitor Cst(j, k) have different shapes.

For example, referring to FIG. 13, based on the above, the data writing transistor T1(*i, k*), the driving transistor T3(*i, k*), the first light-emitting transistor T5(*h, k*), the first reset transistor T4(*h, k*), the driving transistor T3(*j, k*) and the data writing transistor T1(*j, k*) are sequentially arranged along the extending direction of the data line DL(k). Thus, active layers and gates constituting these transistors are sequentially arranged according to the positions of these transistors, which will not be described here.

For example, the first connection line 210 is connected to the first electrode T31 of the driving transistor T3(*i, k*), the second electrode T52 of the first light-emitting transistor T5(*h, k*), the first electrode T41 of the first reset transistor T4(*h, k*) and the first electrode T31 of the driving transistor T3(*j, k*).

Figure 14:
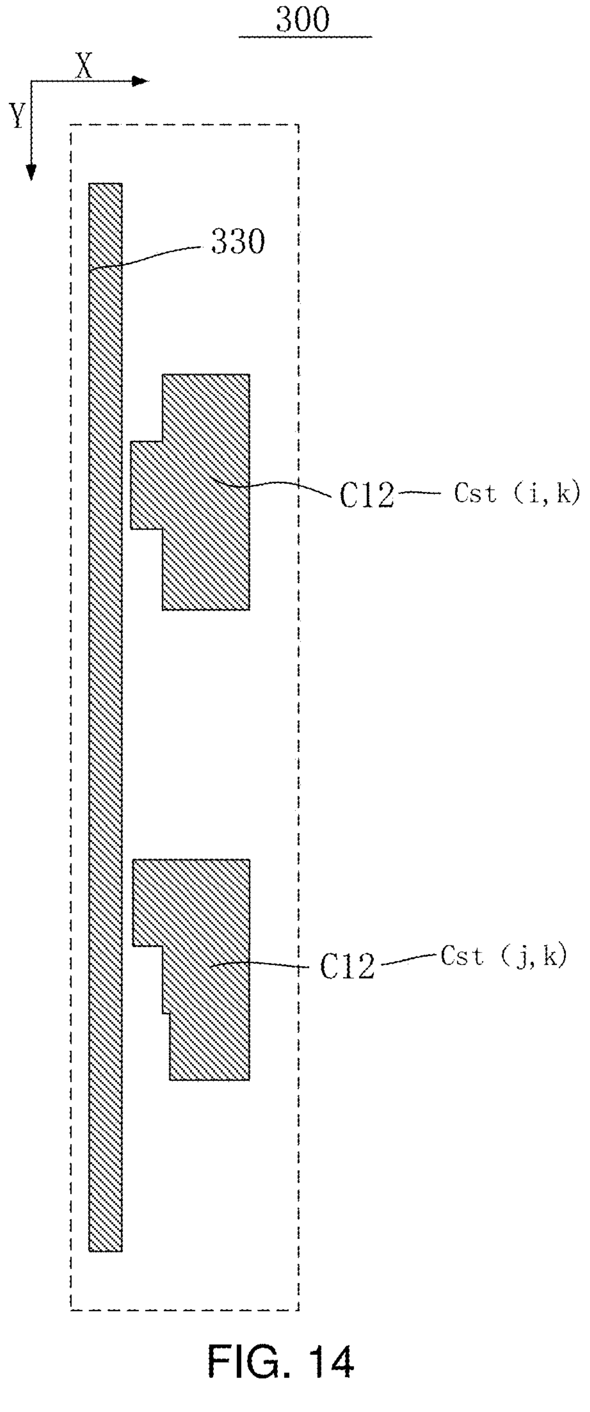
FIG. 14 is a structural diagram of a third pattern layer in FIG. 6.

Referring to FIG. 14, the third pattern layer 300 is made of a conductive material. For details, reference may be made to the relevant description of the second conductive pattern layer 200.

The third pattern layer 300 includes first electrode plates C11 of capacitors Cst. The third pattern layer 300 further includes first power supply voltage lines 330, and the first power supply voltage line 330 may extend along the second direction Y.

For example, an overlapping area between the first electrode plate C11 and the second electrode plate C12 of the capacitor Cst(i, k) is equal to an overlapping area between the first electrode plate C11 and the second electrode plate C12 of the capacitor Cst(j, k). That is, a capacitance value of the capacitor Cst(i, k) is equal to a capacitance value of the capacitor Cst(j, k).

For example, the first electrode plate C11 of the capacitor Cst(i, k) and the first electrode plate C11 of the capacitor Cst(j, k) have different shapes.

Figure 15:
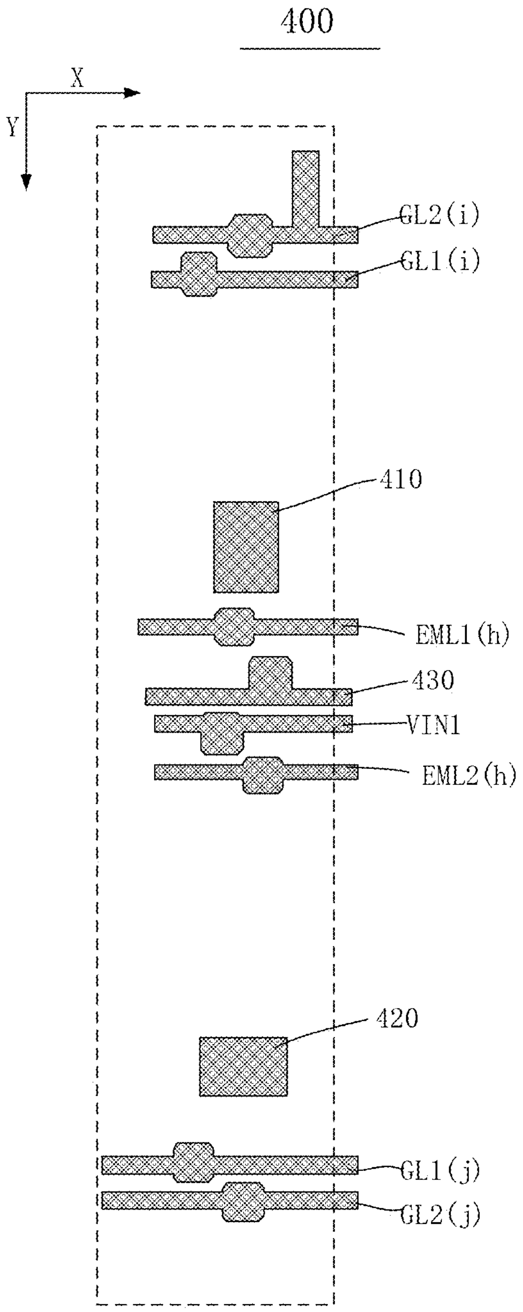
FIG. 15 is a structural diagram of a fourth pattern layer in FIG. 6.

Referring to FIG. 15, the fourth pattern layer 400 is made of a conductive material. For details, reference may be made to the relevant description of the second conductive pattern layer 200.

For example, the fourth pattern layer 400 includes first transfer patterns 410 and second transfer patterns 420. The fourth pattern layer 400 further includes first scanning signal lines GL1, second scanning signal lines GL2, second power supply voltage lines 430, initialization signal lines VIN1, first light-emitting control signal lines EML1 and second light-emitting control signal lines EML2. A second power supply voltage line 430 is coupled to a first power supply voltage line 330 and a first power supply voltage terminal VDD, and is configured to provide a power supply voltage to the first power supply voltage terminal VDD.

For example, the second scanning signal line GL2(*i*), the first scanning signal line GL1(*i*), a first transfer pattern 410, the first light-emitting control signal line EML1(*h*), a second power supply voltage line 430, the initialization signal line VIN1, the second light-emitting control signal line EML2 (*h*), a second transfer pattern 420, the first scanning signal line GL1(*j*) and the second scanning signal line GL2(*j*) are sequentially arranged along the extending direction of the data line (the positive direction of the second direction Y).

For example, the first scanning signal lines GL1, the second scanning signal lines GL2, the second power supply voltage line 430, the initialization signal line VIN1, the first light-emitting control signal line EML1(*h*), and the second light-emitting control signal line EML2(*h*) each extend along the first direction X.

Figure 16:
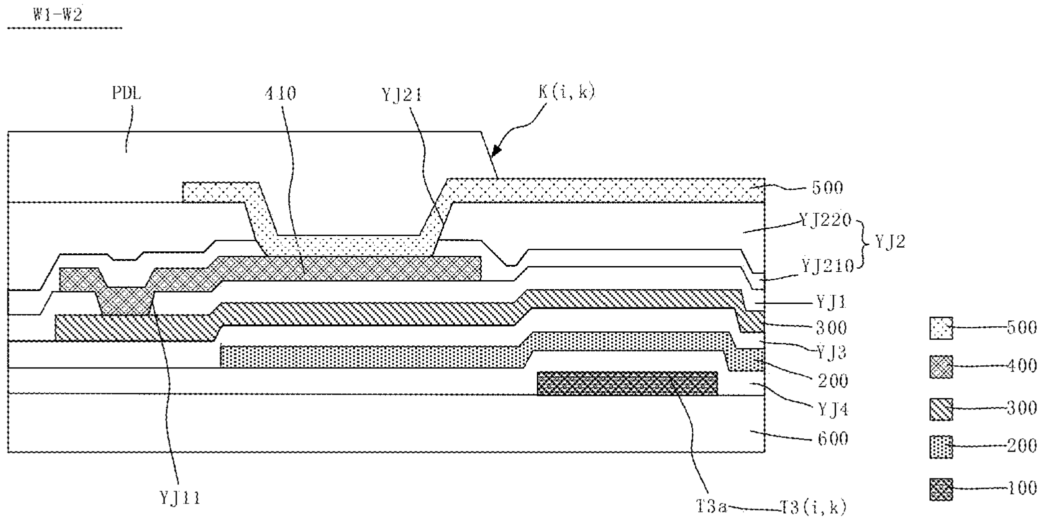
FIG. 16 is a sectional view taken along the line W1-W2 in FIG. 7.

Referring to FIGS. 6 and 16, the first insulating layer YJ1 is located between the third pattern layer 300 and the fourth pattern layer 400. The second insulating layer YJ2 is located between the fourth pattern layer 400 and the light-emitting devices ED. The display panel further includes: a fourth insulating layer YJ4 located between the first pattern layer 100 (e.g., a layer in which the active layer T3*a* of the driving transistor T3(*i, k*) is located) and the second pattern layers 200, and a third insulating layer YJ3 located between the third pattern layer 300 and the second pattern layers 200.

For example, the second insulating layer YJ2 includes an inorganic insulating YJ10 and an organic insulating layer YJ20 that are stacked, the organic insulating layer YJ20 is in contact with the light-emitting devices ED (e.g., the anodes of the light-emitting devices ED), and the inorganic insulating YJ10 may be in contact with the fourth pattern layer 400.

For example, the first insulating layer YJ1 has a first through hole YJ11 located at the second coupling position P2, and further has a third through hole YJ12 located at the fourth coupling position P4.

For example, for the first pixel driving circuit Q(i, k), a portion of the first insulating layer YJ1 is located between the first transfer pattern 410 and the first electrode plate C11 of the capacitor Cst(i, k); for the second pixel driving circuit Q(j, k), another portion of the first insulating layer YJ1 is located between the second transfer pattern 420 and the first electrode plate C11 of the capacitor Cst(j, k).

For example, the second insulating layer YJ2 has a second through hole YJ21 located at the second coupling position P2, and further has a fourth through hole YJ22 located at the fourth coupling position P4.

For example, a portion of the second insulating layer YJ2 is located between the first transfer pattern 410 and the first light-emitting device ED(i, k), and another portion of the second insulating layer YJ2 is also located between the second transfer pattern 420 and the second light-emitting device ED(j, k). For example, the portion of the second insulating layer YJ2 is located between the first transfer pattern 410 and the anode of the first light-emitting device ED(i, k), and the another portion of the second insulating layer YJ2 is also located between the second transfer pattern 420 and the anode of the second light-emitting device ED(j, k).

In an implementable example, the first transfer pattern 410 is coupled to the first electrode plate C11 of the capacitor Cst(i, k) at the first through hole YJ11, and is coupled to the anode of the first light-emitting device ED(i, k) at the second through hole YJ21. The second transfer pattern 420 is coupled to the first electrode plate C11 of the capacitor Cst(j, k) at the third through hole YJ12, and is coupled to the anode of the second light-emitting device ED(j, k) at the fourth through hole YJ22.

In an implementable example, in the thickness direction of the display panel (i.e., in a direction perpendicular to a plane formed by the second direction Y and the first direction X), the first through hole YJ11 and the second through hole YJ21 are staggered, which means that, orthographic projections of the first through hole YJ11 and the second through hole YJ21 on the base substrate are not overlapped. In the thickness direction of the display panel, the third through hole YJ12 and the fourth through hole YJ22 are staggered, which means that, orthographic projections of the third through hole YJ12 and the fourth through hole YJ22 on the base substrate are not overlapped.

In an implementable example, the first transfer pattern 410 and the second transfer pattern 420 each are substantially in a shape of a rectangle. For example, they each are in a shape of a rectangle or a rectangle with rounded corners.

A long side of the first transfer pattern 410 is substantially parallel to the extending direction of the data line DL(k) (the second direction Y). For example, the long side of the first transfer pattern 410 is parallel to the extending direction of the data line DL(k) (the second direction Y). As another example, an included angle exists between the long side of the first transfer pattern 410 and the extending direction of the data line DL(k) (the second direction Y), and the included angle is in a range of 0° to 5°, inclusive. The first through hole YJ11 and the second through hole YJ21 are sequentially arranged along the long side of the first transfer pattern 410. In this case, a gap exists between the first through hole YJ11 and the second through hole YJ21 along an extending direction of the long side of the first transfer pattern 410. For example, the second through hole YJ21 and the first through hole YJ11 are sequentially arranged along the positive direction (an extending direction of the arrow) of the second direction Y. As another example, the second through holes YJ21 and the first through holes YJ11 are sequentially arranged along a negative direction (a direction opposite to the positive direction) of the second direction Y.

A long side of the second transfer pattern 420 intersects the extending direction of the data line DL(k) (the second direction Y). For example, the long side of the second transfer pattern 420 is perpendicular to the extending direction of the data line DL(k) (the second direction Y). That is, the long side of the second transfer pattern 420 is parallel to the first direction X. The fourth through hole YJ22 and the third through hole YJ12 are sequentially arranged along the long side of the second transfer pattern 420. In this case, a gap exists between the fourth through hole YJ22 and the third through hole YJ12 along the extending direction of the long side of the second transfer pattern 420. For example, the fourth through hole YJ22 and the third through hole YJ12 are sequentially arranged along a positive direction (an extending direction of an arrow) of the first direction X. As another example, the fourth through hole YJ22 and the third through hole YJ12 are sequentially arranged along a negative direction (a direction opposite to the positive direction) of the first direction X. Areas of orthographic projections, in the thickness direction of the display panel, of the first transfer pattern 410 and the second transfer pattern 420 are equal.

Figure 17:
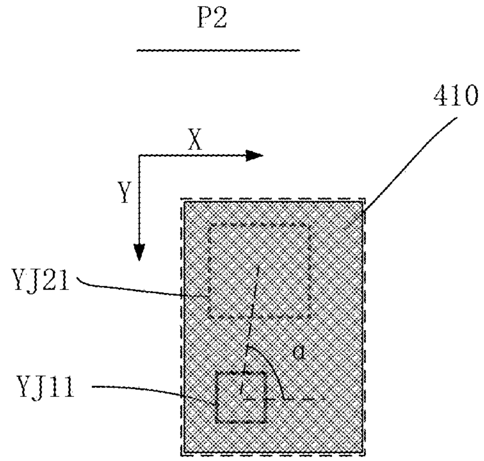
FIG. 17 is an enlarged view of a second coupling position P2 in FIG. 6.
Figure 18:
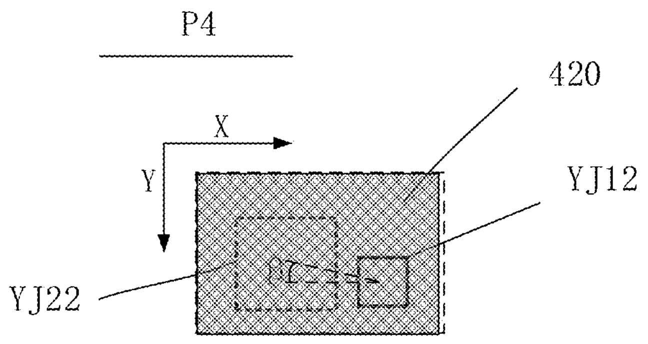
FIG. 18 is an enlarged view of a fourth coupling position P4 in FIG. 6.

Referring to FIGS. 17 and 18, in an implementable example, a line connecting centers of the first through hole YJ11 and the second through hole YJ21 intersects a line connecting centers of the third through hole YJ12 and the fourth through hole YJ22. For example, an included angle $\alpha$ exists between the positive direction of the first direction X and the line connecting the centers of the second through hole YJ21 and the first through hole YJ11, and a is in a range of 0° to 180°, inclusive (such as 10°, 30°, 45°, 60°, 90°, 120° and) 150°. An included angle $\beta$ exists between the negative direction of the first direction X and the line connecting the centers of the third through hole YJ12 and the fourth through hole YJ22, $\beta$ is in a range of 0° to 180°, inclusive (such as 10°, 30°, 45°, 60°, 90°, 120° and 150°). $\alpha$ and $\beta$ may be supplementary or not.

Figure 19:
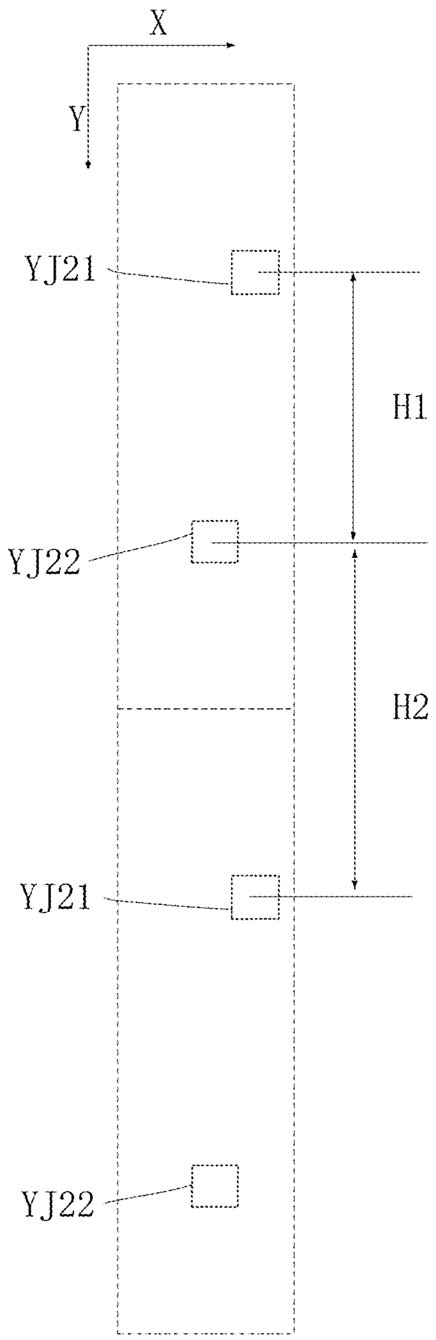
FIG. 19 is a schematic diagram showing two adjacent rows of pixel driving circuit groups provided in some embodiments of the present disclosure.

Referring to FIG. 19, in an implementable example, in the extending direction of the data line DL(k), a distance between the second through hole YJ21 and the fourth through hole YJ22 is substantially equal to a pixel dimension of the display panel. The pixel dimension is determined by a resolution of the display panel. That is, the pixel dimension is a width of the display panel divided by the number of rows of pixel driving circuits). For example, in the extending direction of the data line DL(k) (the positive direction of the second direction Y), the distance between a second through hole YJ21 and a fourth through hole YJ22 in a same pixel driving circuit group F is 95% to 100% (such as 95% %, 96%, 97%, 98%, 99% and 100%) of the pixel dimension of the display panel. For example, in the positive direction of the second direction Y (the extending direction of the arrow), a distance between the second through hole YJ21 and the fourth through hole YJ22 in the same pixel driving circuit group F is H1, and a distance between a fourth through hole YJ22 and an adjacent second through hole YJ21 that are in two adjacent rows of pixel driving circuit groups F is H2. If the number of rows of the pixel driving circuits is 2n, n distances (H1) and (n−1) distances (H2) may be obtained, a ratio of an average value of n distances (H1) to an average value of (n−1) distances (H2) may be, for example, less than or equal to 10%, 8%, 5%, 4% or 2%.

Figure 20:
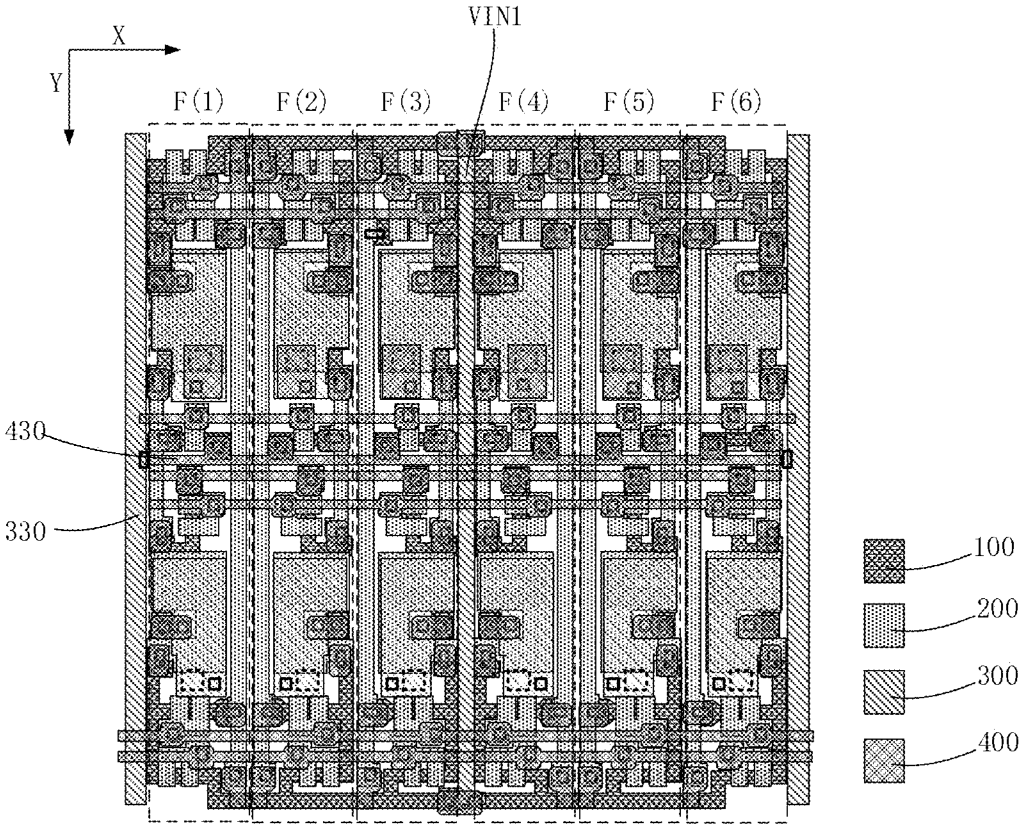
FIG. 20 is a structural diagram of a pixel unit provided in some embodiments of the present disclosure.

FIG. 20 is a structural diagram showing a plurality of pixel driving circuit groups F arranged along the first direction X.

Referring to FIG. 20, in the positive direction (the extending direction of the arrow) of the first direction X, the plurality of pixel driving circuit groups F constitute a display unit, and the plurality of pixel driving circuit groups F are denoted as F(1) to F(m). For example, a display unit includes six pixel driving circuit groups F sequentially arranged along the positive direction (the extending direction of the arrow) of the first direction X, and the six pixel driving circuit groups F are denoted as F(1) to F(6). A pixel driving circuit group F(1) and a pixel driving circuit group F(4) each have the structure shown in FIG. 6. A pixel driving circuit group F(2), a pixel driving circuit group F(3), a pixel driving circuit group F(5) and a pixel driving circuit group F(6) are each mirrored with respect to the pixel driving circuit group F(1). The reference signal line VIN1 is located between the pixel driving circuit group F(3) and the pixel driving circuit group F(4). The power supply voltage line 330 is located at a side of the pixel driving circuit group F(1) away from the pixel driving circuit group F(2).

Figure 21:
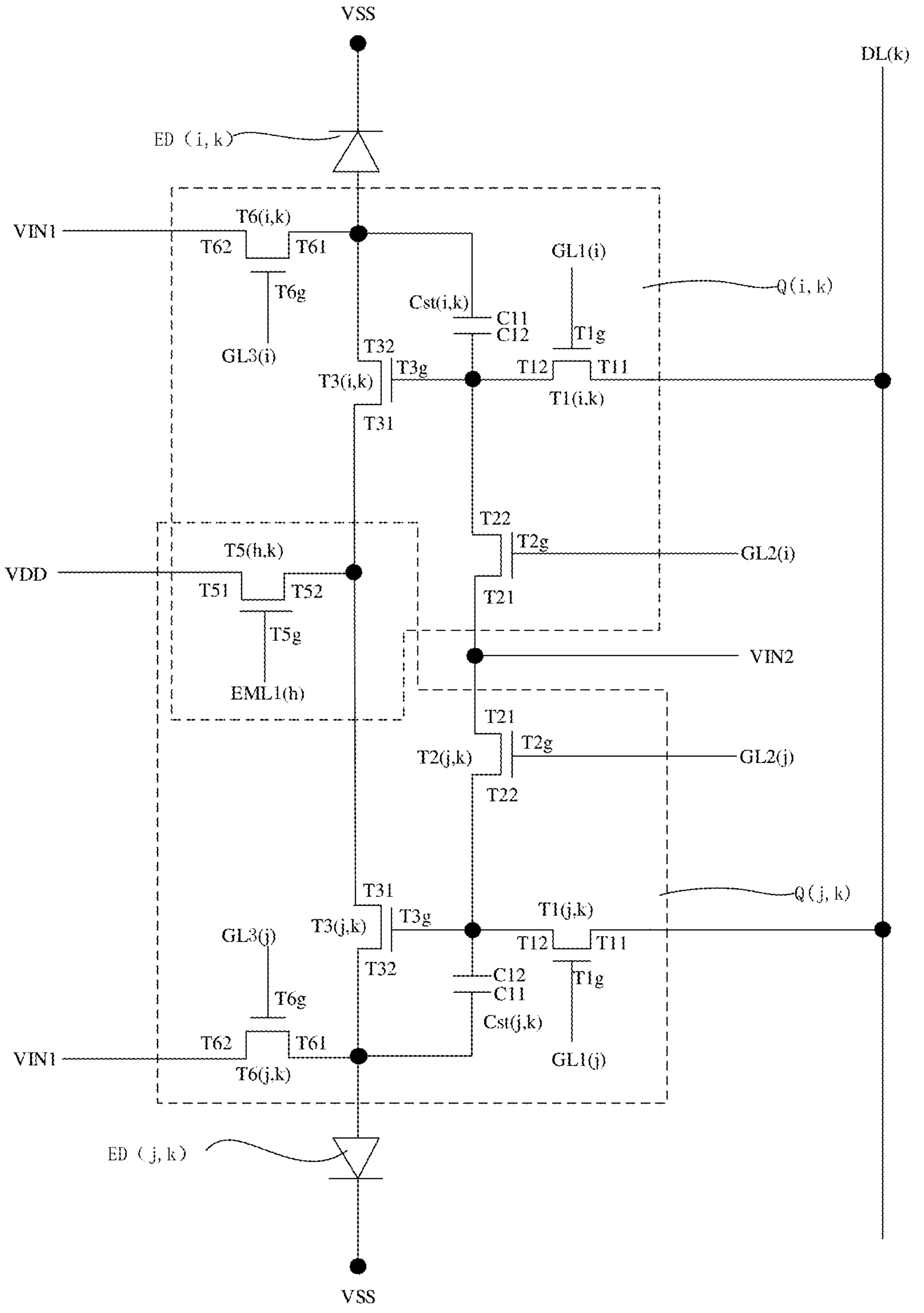
FIG. 21 is a circuit diagram of a pixel driving circuit group provided in some embodiments of the present disclosure.

FIG. 21 is a circuit diagram in which the first reset transistor T4 in FIG. 4 is replaced with second reset transistors T6.

In some embodiments, referring to FIG. 21, the first pixel driving circuit and the second pixel driving circuit each include a second reset transistor T6. The second reset transistor T6 includes: a gate T6*g*, a first electrode T61 and a second electrode T62.

For example, the first electrode T61 of the second reset transistor T6 is coupled to the second electrode T32 of the driving transistor T3. For example, a first electrode T61 of a second reset transistor T6(*i, k*) is coupled to the second electrode T32 of the driving transistor T3(*i, k*), and a first electrode T61 of a second reset transistor T6(*j, k*) is coupled to the second electrode T32 of the driving transistor T3(*j, k*). The second electrode T62 of the second reset transistor T6 is coupled to the initialization signal line VIN1. The gate T6*g* of the second reset transistor T6 is coupled to a third scanning signal line GL3. For example, a gate T6*g* of the second reset transistor T6(*i, k*) is coupled to a third scanning signal line GL3(*i*), and a gate T6*g* of the second reset transistor T6(*j, k*) is coupled to a third scanning signal line GL3(*j*).

Figure 22:
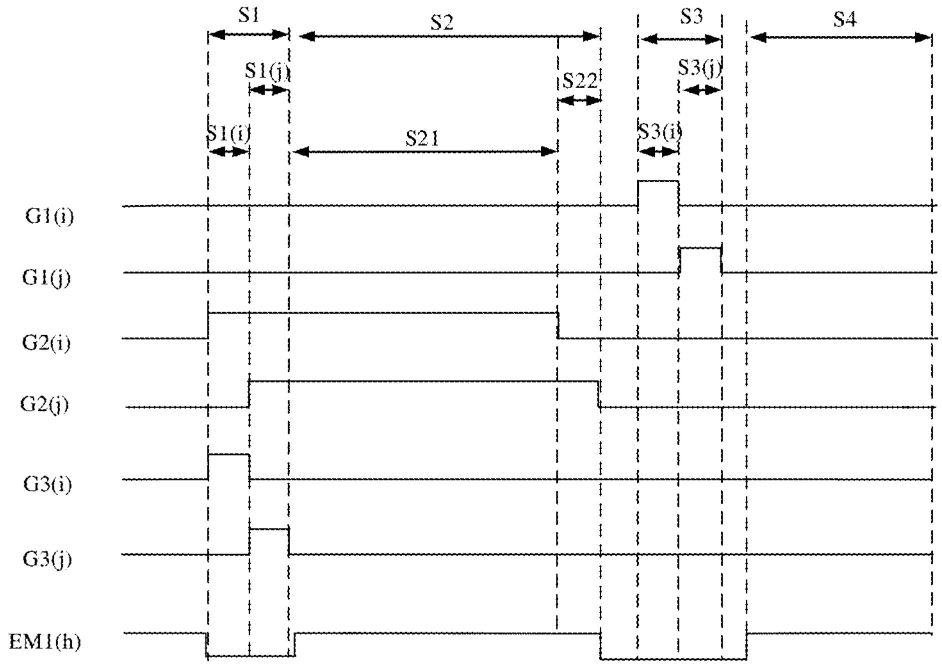
FIG. 22 is a signal timing diagram of the pixel driving circuit group F in FIG. 21.

Referring to FIG. 22, FIG. 22 is a method for driving the pixel driving circuit group F in FIG. 21.

The method for driving the pixel driving circuit group (including the first pixel driving circuit and the second pixel driving circuit) in FIG. 21 will be described below. For example, the driving method may include the following phases to compensate the written data signal. Referring to FIGS. 21 and 22, the method for driving the pixel driving circuit group F includes following steps.

In a first phase S1, for the pixel driving circuit group F, the second electrode T32 of the driving transistor T3(*i, k*) and the second electrode T32 of the driving transistor T3(*j, k*) are reset, and the reference signal is written into both the gate T3*g* of the driving transistor T3(*i, k*) and the gate T3*g* of the driving transistor T3(*j, k*).

The first phase S1 includes a first sub-phase S1(*i*) and a second sub-phase S1(*j*).

In the first sub-phase S1(*i*), for the first pixel driving circuit Q(i, k), the reference signal transistor T2(*i, k*) and the second reset transistor T6(*i, k*) are both turned on, and the data writing transistor T1(*i, k*) and the first light-emitting transistor T5(*h, k*) are turned off. The reference signal transistor T2(*i, k*) transmits, in response to a voltage of the second scanning signal G2(*i*) provided by the second scanning signal line GL2(*i*) being an effective voltage (e.g., at a high level), the reference signal (a voltage of which is Vref) applied to the reference signal line VIN2 to the gate T3*g* of the driving transistor T3(*i, k*), so that the driving transistor T3(*i, k*) is turned on. The second reset transistor T6(*i, k*) transmits, in response to a voltage of a third scanning signal G3(*i*) transmitted by the third scanning signal line GL3(*i*) being an effective voltage (e.g., at a high level), the initialization signal applied to the initialization signal line VIN1 to the second electrode T32 of the driving transistor T3(*i, k*), so as to reset the second electrode T32.

In the second sub-phase S1(*j*), for the second pixel driving circuit Q(j, k), the reference signal transistor T2(*j, k*) and the second reset transistor T6(*j, k*) are turned on, and the data writing transistor T1(*j, k*) and the first light-emitting transistor T5(*h, k*) are turned off. The reference signal transistor T2(*j, k*) transmits, in response to a voltage of the second scanning signal G2(*j*) provided by the second scanning signal line GL2(*j*) being an effective voltage (e.g., at a high level), the reference signal (the voltage of which is Vref) applied to the reference signal line VIN2 to the gate T3*g* of the driving transistor T3(*j, k*), so that the driving transistor T3(*j, k*) is turned on. The second reset transistor T6(*j, k*) transmits, in response to a voltage of a third scanning signal G3(*j*) transmitted by the third scanning signal line GL3(*j*) being an effective voltage (e.g., at a high level), the initialization signal applied to the initialization signal line VIN1 to the second terminal T32 of the driving transistor T3(*j, k*), so that the second electrode T32 of the driving transistor T3(*j, k*) is reset.

In a second phase S2, for the pixel driving circuit group F, threshold voltage compensation is performed on each of the second electrode of the driving transistor T3(*i, k*) and the second electrode of the driving transistor T3(*j, k*).

The second phase S2 may include a first sub-phase S21 and a second sub-phase S22.

In the first sub-phase S21, the reference signal transistor T2(*i, k*), the driving transistor T3(*i, k*), the reference signal transistor T2(*j, k*) and the driving transistor T3(*j, k*) continue to be turned on, the first light-emitting transistor T5(*h, k*) is turned on, and the second reset transistor T6(*i, k*), the second reset transistor T6(*j, k*), the data writing transistor T1(*j, k*) and the data writing transistor T1(*i, k*) are turned off.

The first light-emitting transistor T5(*h, k*) transmits, in response to a voltage of the first light-emitting signal EM1(*h*) provided by the first light-emitting control signal line EML1(*h*) being an effective voltage (e.g., at a high level), the voltage applied to the first power supply voltage terminal VDD to both the first electrode T31 of the driving transistor T3(*i, k*) and the first electrode T31 of the driving transistor T3(*j, k*), so that both the capacitor Cst(i, k) and the capacitor Cst(j, k) are charged. In this way, a voltage of the second electrode T32 of the driving transistor T3(*i, k*) (which may also be referred to as a voltage of the first electrode plate C11 of the capacitor Cst(i, k), or a voltage of the anode of the first light-emitting device ED(i, k)) reaches (Vref−Vth) (Vth being the threshold voltage of the third transistor T3(*i, k*). Similarly, a voltage of the second electrode T32 of the driving transistor T3(*j, k*) reaches (Vref−Vth) (Vth being the threshold voltage of the third transistor T3(*j, k*)).

In the second sub-phase S22, the first light-emitting transistor T5(*h, k*) and the driving transistor T3(*i, k*) continue to be turned on, and the reference signal transistor T2(*i, k*), the second reset transistor T6(*i, k*) and the data writing transistor T1(*i, k*) are turned off.

Since the voltage across two terminals of the capacitor Cst(i, k) does not change suddenly, the voltage of the second electrode T32 of the driving transistor T3(*i, k*) continues to be maintained at (Vref−Vth).

In a third phase S3, for the pixel driving circuit group F, the data signal is written into the gate T3*g* of the driving transistor T3(*i, k*) and the gate T3*g* of the driving transistor T3(*j, k*).

In a first sub-phase S3(*i*) of the third phase S3, the data writing transistor T1(*i, k*) and the driving transistor T3(*i, k*) are turned on, and the reference signal transistor T2(*i, k*), the first light-emitting transistor T5(*h, k*) and the second reset transistor T6(*i, k*) may be turned off.

The data writing transistor T1(*i, k*) transmits, in response to a voltage of the first scanning signal G1(*i*) provided by the first scanning signal line GL1(*i*) being an effective voltage (e.g., at a high level), the data signal (a voltage of which is Vdata(i, k)) applied to the data line DL(k) to the gate T3*g* of the driving transistor T3(*i, k*). A voltage difference between the gate T3*g* and the second electrode T32 of the driving transistor T3(*i, k*) (which may be, for example, referred to as the gate-source voltage of the driving transistor T3(*i, k*)) is (Vdata(i, k)−(Vref−Vth)). That is, the voltage difference is the voltage difference across the two terminals of the capacitor Cst(i, k).

In a second sub-phase S3(*j*) of the third phase S3, the data writing transistor T1(*j, k*) and the driving transistor T3(*j, k*) are turned on, and the reference signal transistor T2(*j, k*), the first light-emitting transistor T5(*h, k*) and the second reset transistor T6(*j, k*) are turned off.

The data writing transistor T1(*j, k*) transmits, in response to a voltage of the first scanning signal G1(*j*) provided by the first scanning signal line GL1(*j*) being an effective voltage (e.g., at a high level), the data signal (a voltage of which is Vdata(j, k)) applied to the data line DL(k) to the gate T3*g* of the driving transistor T3(*j, k*). A voltage difference between the gate T3*g* and the second electrode T32 of the driving transistor T3(*j, k*) is (Vdata(j, k)−(Vref−Vth)). That is, the voltage difference is the voltage difference across two terminals of the capacitor Cst(j, k).

In a fourth phase S4, only the driving transistors T3 and the first light-emitting transistor T5(*h, k*) are turned on. The first light-emitting transistor T5(*h, k*) transmits, in response to the voltage of the first light-emitting signal EM1(*h*) provided by the first light-emitting control signal line EML1(*h*) being the effective voltage (e.g., at the high level), the voltage applied to the first power supply voltage terminal VDD to both the first electrode T31 of the driving transistor T3(*i, k*) and the first electrode T31 of the driving transistor T3(*j, k*), so that the first light-emitting device ED(i, k) and the second light-emitting device ED (j, k) both emit light.

Since the voltage across two terminals of a capacitor Cst does not change suddenly, the voltage difference between the gate T3*g* and the second electrode T32 of the driving transistor T3 is maintained at the state in the third phase. As a result, magnitudes of currents flowing through the first light-emitting device ED(i, k) and the second light-emitting device ED(j, k) are independent of their respective threshold voltages.

In the embodiments, for the data writing transistors T1, the driving transistors T3 and the reference signal transistors T2 in a structural diagram corresponding to FIG. 21, positions thereof and connections therebetween may refer to the relevant description for FIG. 6. For a position between the driving transistor T3(*i, k*) and the driving transistor T3(*j, k*), there are multiple differences between the structural diagram corresponding to FIG. 21 and the structural diagram of FIG. 6. For example, the second reset transistor T6(*i, k*), the first light-emitting transistor T5(*h, k*) and the second reset transistor T6(*j, k*) are sequentially arranged along the positive direction (the extending direction of the arrow) of the second direction Y.

Figure 23:
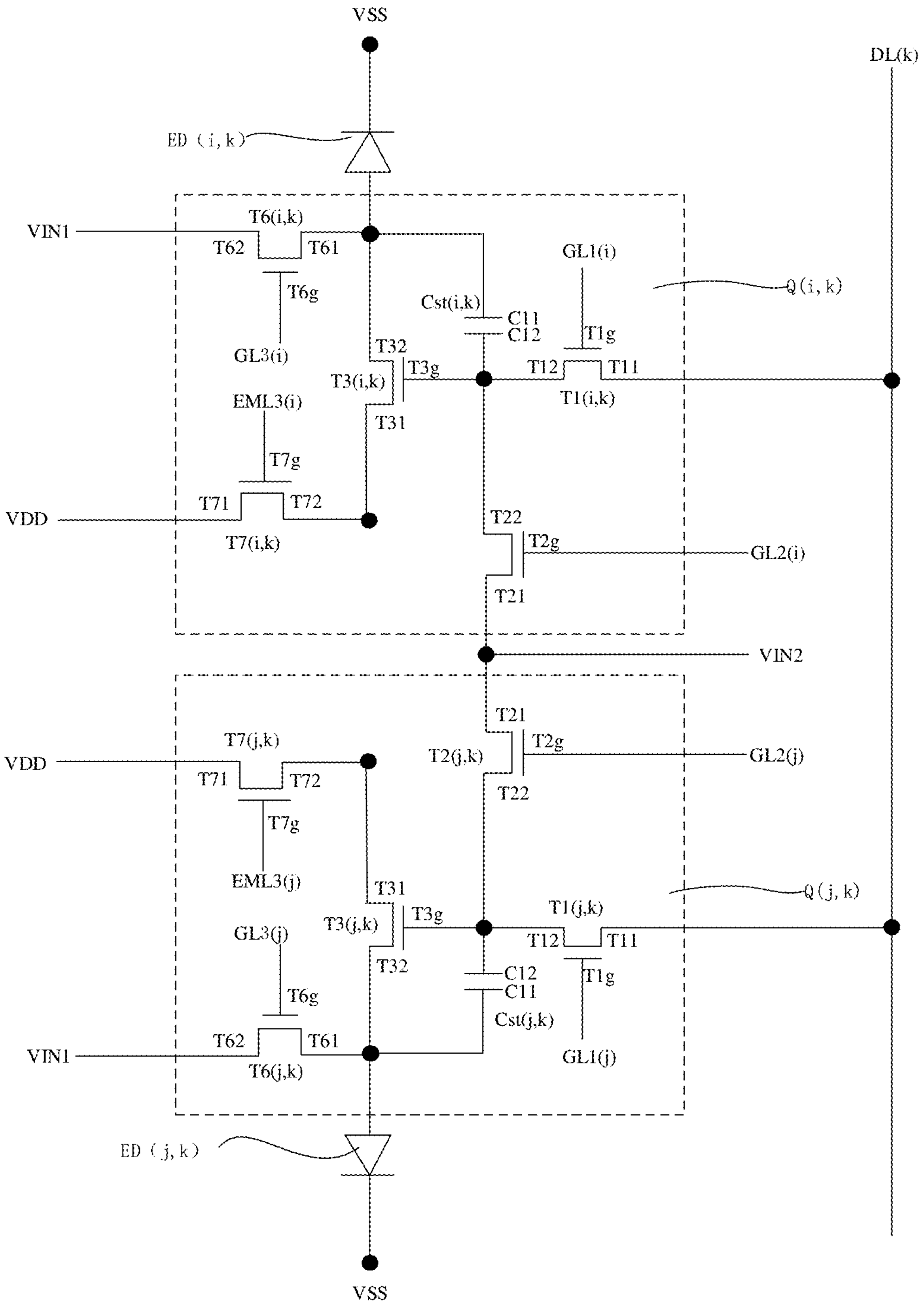
FIG. 23 is a circuit diagram of a pixel driving circuit group provided in some embodiments of the present disclosure.

FIG. 23 is a circuit diagram in which the first light-emitting transistor T5 in FIG. 21 is replaced with second light-emitting transistors T7.

In some embodiments, referring to FIG. 23, the first pixel driving circuit Q(i, k) and the second pixel driving circuit Q(j, k) each include a second light-emitting transistor T7. The second light-emitting transistor T7 includes: a gate T7*g*, a first electrode T71 and a second electrode T72.

For example, the second electrode T72 of the second light-emitting transistor T7 is coupled to the first electrode T31 of the driving transistor T3. For example, a second electrode T72 of a second light-emitting transistor T7(*i, k*) is coupled to the first electrode T31 of the driving transistor T3(*i, k*), and a second electrode T72 of a second light-emitting transistor T7(*j, k*) is coupled to the first electrode T31 of the driving transistor T3(*j, k*). The first electrode T71 of the second light-emitting transistor T7 is coupled to the first power supply voltage terminal VDD. The gate T7*g* of the second light-emitting transistor T7 is coupled to a third light-emitting control line EML3. For example, a gate T7*g* of the second light-emitting transistor T7(*i, k*) is coupled to a third light-emitting control line EML3(*i*), and a gate T7*g* of the second light-emitting transistor T7(*j, k*) is coupled to a third light-emitting control line EML3(*j*).

Figure 24:
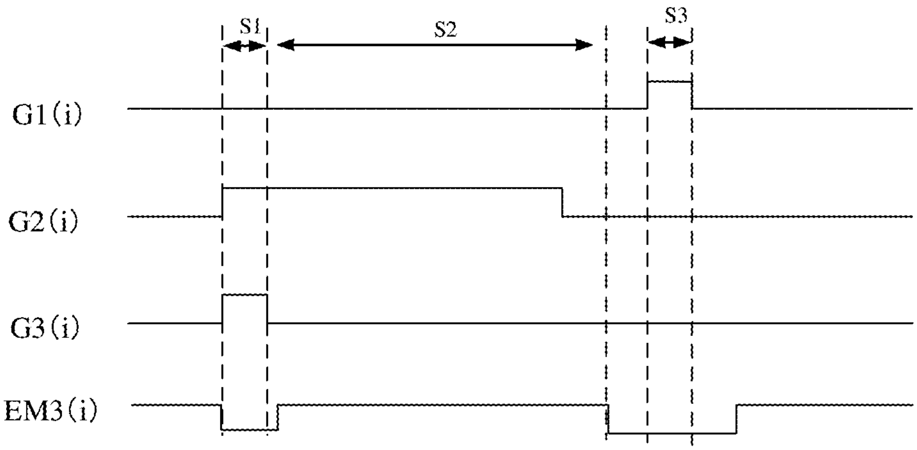
FIG. 24 is a signal timing diagram of the pixel driving circuit group F in FIG. 23.

Referring to FIG. 24, FIG. 24 is a method for driving the pixel driving circuit group F in FIG. 23.

The method for driving the pixel driving circuit group F (including the first pixel driving circuit and the second pixel driving circuit) in FIG. 23 will be described below. For example, the driving method may include the following phases to compensate the written data signal. Referring to FIGS. 23 and 24, the method for driving the pixel driving circuit group F includes following steps.

In a first phase S1, for the first pixel driving circuit Q(i, k), the reference signal transistor T2(*i, k*) and the second reset transistor T6(*i, k*) are both turned on, and the data writing transistor T1(*i, k*) and the second light-emitting transistor T7(*i, k*) may be turned off. The reference signal transistor T2(*i, k*) transmits, in response to a voltage of the second scanning signal G2 (*i*) provided by the second scanning signal line GL2 (*i*) being an effective voltage (e.g., at a high level), the reference signal (a voltage of which is Vref) applied to the reference signal line VIN2 to the gate T3*g* of the driving transistor T3(*i, k*), so that the driving transistor T3(*i, k*) is turned on. The second reset transistor T6(*i, k*) transmits, in response to a voltage of a third scanning signal G3(*i*) transmitted by the third scanning signal line GL3(*i*) being an effective voltage (e.g., at a high level), the initialization signal applied to the initialization signal line VIN1 to the second electrode T32 of the driving transistor T3(*i, k*), so that the second electrode T32 of the driving transistor T3(*i, k*) is reset.

In a first sub-phase of a second phase S2, the reference signal transistor T2(*i, k*) and the driving transistor T3(*i, k*) continue to be turned on, the second light-emitting transistor T7(*i, k*) is turned on, and the second reset transistor T6(*i, k*) and the data writing transistor T1(*i, k*) are turned off.

The second light-emitting transistor T7(*i, k*) transmits, in response to a voltage of a third light-emitting signal EM3(*i*) provided by the third light-emitting control signal line EML3(*i*) being an effective voltage (e.g., at a high level), the voltage applied to the first power supply voltage terminal VDD to the first electrode T31 of the driving transistor T3(*i, k*), so that the capacitor Cst(i,k) is charged. In this way, a voltage of the second electrode T32 of the driving transistor T3(*i, k*) (which may also be referred to as a voltage of the first electrode plate C11 of the capacitor Cst(i, k), or a voltage of the anode of the first light-emitting device ED(i, k)) reaches (Vref−Vth) (Vth being the threshold voltage of the third transistor T3(*i, k*)).

In a second sub-phase of the second phase S2, the second light-emitting transistor T7(*i, k*) and the driving transistor T3(*i, k*) continue to be turned on, and the reference signal transistor T2(*i, k*), the second reset transistor T6(*i, k*) and the data writing transistor T1(*i, k*) are turned off.

Since the voltage across two terminals of the capacitor Cst(i, k) does not change suddenly, the voltage of the second electrode T32 of the driving transistor T3(*i, k*) continues to be maintained at (Vref−Vth).

In a third phase S3, the data writing transistor T1(*i, k*) and the driving transistor T3(*i, k*) are turned on, and the reference signal transistor T2(*i, k*), the second light-emitting transistor T7(*i, k*) and the second reset transistor T6(*i, k*) are turned off. The data writing transistor T1(*i, k*) transmits, in response to a voltage of the first scanning signal G1(*i*) provided by the first scanning signal line GL1(*i*) being an effective voltage (e.g., at a high level), the data signal applied to the data line DL(k) to the gate T3*g* of the driving transistor T3(*i, k*), so that the driving transistor T3(*i, k*) is turned on. The voltage difference between the gate T3*g* and the second electrode T32 of the driving transistor T3(*i, k*) (which may be, for example, referred to as the gate-source voltage of the driving transistor T3(*i, k*)) is (Vdata(i, k)−(Vref−Vth)). That is, the voltage difference is the voltage difference across the two terminals of the capacitor Cst(i, k).

In a fourth phase S4, only the driving transistors T3 and the second light-emitting transistor T7(*i, k*) are turned on. The second light-emitting transistor T7(*i, k*) transmits, in response to the third light-emitting signal EM3(*i*) provided by the third light-emitting control signal line EML3(*i*) being the effective voltage (e.g., at the high level), the voltage applied to the first power supply voltage terminal VDD to the first electrode T31 of the driving transistor T3(*i, k*), so that the first light-emitting device ED(i, k) emits light.

Since the voltage across two terminals of the capacitor Cst does not change suddenly, the voltage difference between the gate T3*g* of the driving transistor T3 and the second electrode T32 of the driving transistor T3 maintains at the state in the third phase. As a result, a magnitude of the current flowing through the first light-emitting device ED(i, k) is independent of its respective threshold voltage.

It will be noted that, in the embodiments shown in FIG. 23, coupling positions of electrical components in the first pixel driving circuit and the second pixel driving circuit are exactly the same. Therefore, for a method for driving the second pixel driving circuit, reference may be made to the relevant description of the first pixel driving circuit.

In the embodiments, for the data writing transistors T1, the driving transistors T3, and the reference signal transistors T2 in a structural diagram corresponding to FIG. 23, positions thereof and connections therebetween may refer to the relevant description for FIG. 6. For a position between the driving transistor T3(*i, k*) and the driving transistor T3(*j, k*), there are multiple differences between the structural diagram corresponding to FIG. 23 and the structural diagram of FIG. 6. For example, the second reset transistor T6(*i, k*), the second light-emitting transistor T7(*i, k*), the second light-emitting transistor T7(*j, k*) and the second reset transistor T6(*j, k*) are sequentially arranged along the positive direction (the extending direction of the arrow) of the second direction Y. For example, there is no first connection line between the first electrode T31 of the driving transistor T3(*i, k*) and the first electrode T31 of the driving transistor T3(*j, k*). That is, the two first electrodes are not coupled.

The foregoing descriptions are merely specific implementation manners of the present disclosure, but the protection scope of the present disclosure is not limited thereto, any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A display panel, comprising:
- a data line;
- a first light-emitting device and a second light-emitting device; and
- a first pixel driving circuit and a second pixel driving circuit each including a capacitor, a driving transistor and a data writing transistor; the data writing transistor being coupled to the data line and the driving transistor, and the capacitor including a first electrode plate and a second electrode plate, wherein
- the data writing transistor in the first pixel driving circuit, the driving transistor in the first pixel driving circuit, the driving transistor in the second pixel driving circuit and the data writing transistor in the second pixel driving circuit are sequentially arranged along an extending direction of the data line;
- the first electrode plate in the first pixel driving circuit is coupled to the driving transistor in the first pixel driving circuit at a first coupling position, and is coupled to the first light-emitting device at a second coupling position; the second coupling position is located at a side of the first coupling position away from the data writing transistor in the first pixel driving circuit; and
- the first electrode plate in the second pixel driving circuit is coupled to the driving transistor in the second pixel driving circuit at a third coupling position, and is coupled to the second light-emitting device at a fourth coupling position; the fourth coupling position is located between the third coupling position and the data writing transistor in the second pixel driving circuit.

2. The display panel according to claim 1, wherein
- the driving transistor includes an active layer, and the active layer of the driving transistor includes a plurality of semiconductor segments that are sequentially distributed along the extending direction of the data line and coupled to each other, and an extending direction of a semiconductor segment in the plurality of semiconductor segments intersects the extending direction of the data line;
- the second coupling position is located at a side of a plurality of semiconductor segments in the first pixel driving circuit away from the first coupling position; and
- the fourth coupling position is located at a side of a plurality of semiconductor segments in the second pixel driving circuit proximate to the third coupling position.

3. The display panel according to claim 1, further comprising:
- a first transfer pattern;
- a first insulating layer located between the first transfer pattern and the first electrode plate in the first pixel driving circuit, the first insulating layer having a first through hole located at the second coupling position; and
- a second insulating layer located between the first transfer pattern and the first light-emitting device, the second insulating layer having a second through hole located at the second coupling position;
- wherein the first transfer pattern is coupled to the first electrode plate in the first pixel driving circuit at the first through hole, and is coupled to the first light-emitting device at the second through hole;
- the first through hole and the second through hole are staggered in a thickness direction of the display panel.

4. The display panel according to claim 3, further comprising:
- a second transfer pattern;
- wherein the first insulating layer is also located between the second transfer pattern and the first electrode plate in the second pixel driving circuit, and the first insulating layer further has a third through hole located at the fourth coupling position;
- the second insulating layer is also located between the second transfer pattern and the second light-emitting device, and the second insulating layer further has a fourth through hole located at the fourth coupling position;
- the second transfer pattern is coupled to the first electrode plate in the second pixel driving circuit at the third through hole, and is coupled to the second light-emitting device at the fourth through hole; and
- the third through hole and the fourth through hole are staggered in the thickness direction of the display panel.

5. The display panel according to claim 4, wherein
- a line connecting centers of the first through hole and the second through hole intersects a line connecting centers of the third through hole and the fourth through hole.

6. The display panel according to claim 4, wherein
- the first transfer pattern and the second transfer pattern each are substantially in a shape of a rectangle; and
- the first through hole and the second through hole are sequentially arranged along a long side of the first transfer pattern, and the third through hole and the fourth through hole are sequentially arranged along a long side of the second transfer pattern.

7. The display panel according to claim 6, wherein
- the long side of the first transfer pattern is substantially parallel to the extending direction of the data line, and the long side of the second transfer pattern intersects the extending direction of the data line.

8. The display panel according to claim 4, wherein
- in the extending direction of the data line, a distance between the second through hole and the fourth through hole is substantially equal to a pixel dimension of the display panel.

9. The display panel according to claim 1, wherein
- the first electrode plate in the first pixel driving circuit and the first electrode plate in the second pixel driving circuit have different shapes, and an overlapping area between the first electrode plate and the second electrode plate in the first pixel driving circuit is equal to an overlapping area between the first electrode plate and the second electrode plate in the second pixel driving circuit.

10. The display panel according to claim 9, wherein the second electrode plate in the first pixel driving circuit and the second electrode plate in the second pixel driving circuit have different shapes.

11. The display panel according to claim 1, wherein a gate of the data writing transistor in each of the first pixel driving circuit and the second pixel driving circuit includes two first sub-gates coupled to each other, the data writing transistor has a first groove, and the first groove separates the two first sub-gates; and an opening of the first groove in the first pixel driving circuit and an opening of the first groove in the second pixel driving circuit face each other.

12. The display panel according to claim 1, wherein the driving transistor in each of the first pixel driving circuit and the second pixel driving circuit includes: a gate, a first electrode and a second electrode; the second electrode of the driving transistor is coupled to the first electrode plate in a same pixel driving circuit:

the first pixel driving circuit and the second pixel driving circuit each further include a reference signal transistor, and the reference signal transistor includes: a gate, a first electrode and a second electrode; the first electrode of the reference signal transistor is configured such that a reference signal is written into the first electrode of the reference signal transistor, and the second electrode of the reference signal transistor is coupled to the second electrode plate and the gate of the driving transistor in a same pixel driving circuit; and in the same pixel driving circuit, the reference signal transistor is located at a side of the data writing transistor away from the driving transistor.

13. The display panel according to claim 12, further comprising:

a reference signal connection line located at a side of the reference signal transistor in the second pixel driving circuit away from the data writing transistor in the second pixel driving circuit, wherein the reference signal connection line intersects the data line and is insulated from the data line, and the reference signal connection line is coupled to the reference signal transistor in the second pixel driving circuit and configured to provide the written reference signal.

14. The display panel according to claim 12, wherein the gate of the reference signal transistor includes two second sub-gates coupled to each other, the reference signal transistor has a second groove, and the second groove separates the two second sub-gates.

15. The display panel according to claim 14, wherein a gate of the data writing transistor in each of the first pixel driving circuit and the second pixel driving circuit includes two first sub-gates coupled to each other, the data writing transistor has a first groove, and the first groove separates the two first sub-gates; and in the first pixel driving circuit, openings of the first groove and the second groove face away from each other; and/or in the second pixel driving circuit, openings of the first groove and the second groove face away from each other.

16. The display panel according to claim 1, wherein the first pixel driving circuit further includes a first light-emitting control transistor, and the first light-emitting control transistor includes: a gate, a first electrode and a second electrode; the first electrode of the first light-emitting control transistor is configured such that a first light-emitting signal is written into the first electrode of the first light-emitting control transistor, and the second electrode of the first light-emitting control transistor is coupled to both a first electrode of the driving transistor in the first pixel driving circuit and a first electrode of the driving transistor in the second pixel driving circuit; the first light-emitting control transistor is located between the driving transistor in the first pixel driving circuit and the driving transistor in the second pixel driving circuit.

17. The display panel according to claim 1, wherein the first pixel driving circuit further includes a first reset transistor, and the first reset transistor includes: a gate, a first electrode and a second electrode; the second electrode of the first reset transistor is configured such that a first initialization signal is written into the second electrode of the first reset transistor, and the first electrode of the first reset transistor is coupled to both a first electrode of the driving transistor in the first pixel driving circuit and a first electrode of the driving transistor in the second pixel driving circuit; the first reset transistor is located between the driving transistor in the first pixel driving circuit and the driving transistor in the second pixel driving circuit.

18. A display apparatus, comprising:

the display panel according to claim 1.

19. The display panel according to claim 1, wherein the first pixel driving circuit and the second pixel driving circuit each further include a second light-emitting control transistor, and the second light-emitting control transistor includes: a gate, a first electrode and a second electrode; the first electrode of the second light-emitting control transistor is configured such that a second light-emitting signal is written into the first electrode of the second light-emitting control transistor, and the second electrode of the second light-emitting control transistor is coupled to the first electrode of the driving transistor in a same pixel driving circuit; in the same pixel driving circuit, the second light-emitting control transistor is located at a side of the driving transistor away from the data writing transistor.

20. The display panel according to claim 1, wherein the first pixel driving circuit and the second pixel driving circuit each further include a second reset transistor, and the second reset transistor includes: a gate, a first electrode and a second electrode; the second electrode of the second reset transistor is configured such that a second initialization signal is written into the second electrode of the second reset transistor, and the first electrode of the second reset transistor is coupled to the second electrode of the driving transistor in a same pixel driving circuit; in the same pixel driving circuit, the second reset transistor is located at a side of the driving transistor away from the data writing transistor.

* * * * *